US009571819B1

(12) United States Patent
Barron

(10) Patent No.: US 9,571,819 B1
(45) Date of Patent: Feb. 14, 2017

(54) EFFICIENT DENSE STEREO COMPUTATION

(71) Applicant: Google Inc., Mountain View, CA (US)

(72) Inventor: Jonathan Tilton Barron, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 320 days.

(21) Appl. No.: 14/487,387

(22) Filed: Sep. 16, 2014

(51) Int. Cl.
*H04N 13/02* (2006.01)
(52) U.S. Cl.
CPC ................... *H04N 13/0239* (2013.01)
(58) Field of Classification Search
None
See application file for complete search history.

(56) References Cited

U.S. PATENT DOCUMENTS

| | | | |
|---|---|---|---|
| 6,046,763 A * | 4/2000 | Roy | G06T 7/0075 348/47 |
| 7,248,968 B2 * | 7/2007 | Reid | G01S 11/12 340/435 |
| 8,275,195 B2 * | 9/2012 | Francini et al. | G06K 9/209 348/413.1 |

FOREIGN PATENT DOCUMENTS

| | | |
|---|---|---|
| WO | 2007/017834 | 2/2007 |
| WO | 2013/078479 | 5/2013 |

OTHER PUBLICATIONS

Tao, Michael et al., SimpleFlow: a Non-iterative, Sublinear Optical Flow Algorithm, Computer Graphics Forum, May 2012, vol. 31 No. 2pt1.

(Continued)

*Primary Examiner* — Christopher S Kelley
*Assistant Examiner* — Kaitlin A Retallick
(74) *Attorney, Agent, or Firm* — McDonnell, Boehnen, Hulbert, & Berghoff LLP

(57) ABSTRACT

Example embodiments may allow for the efficient determination of disparity information for a stereo image pair by embedding pixels of the image pair in a multidimensional dimensional vertex space. Regularly-spaced vertices in the vertex space are associated with pixels of the stereo image pair and disparity loss functions are determined for each of the vertices based on disparity loss functions of the associated pixels. The determined vertex-disparity loss functions can be used to determine vertex disparity values for each of the vertices. Disparity values for pixels of the stereo image pair can be determined based on determined vertex disparity values for respective one or more vertices associated with each of the pixels. The determined pixel disparity values can be used to enable depth-selective image processing, determination of pixel depth maps, mapping and/or navigation of an environment, human-computer interfacing, biometrics, augmented reality, or other applications.

26 Claims, 14 Drawing Sheets

(56) References Cited

OTHER PUBLICATIONS

Krahenbuhl, Philipp and Koltun, Vladlen, Efficient Nonlocal Regularization for Optical Flow, Computer Vision-ECCV 2012, Oct. 2012.

Xiao, Jiangjian et al., Bilateral Filtering-based Optical Flow Estimation with Occlusion Detection, Computer Vision-ECCV 2006, May 2012.

Adams, Andrew et al., Fast High-Dimensional Filtering Using the Permutohedral Lattice, Computer Graphics Forum, May 2010, vol. 29 No. 2.

Scharstein, Daniel and Szeliski, Richard, A taxonomy and evaluation of dense two-frame stereo correspondence algorithms, International Journal of Computer Vision, Apr. 2002, vol. 47 No. 1-3.

Bao, Linchao et al., Fast Edge-Preserving PatchMatch for Large Displacement Optical Flow, IEEE Transactions on Image Processing, 2014.

* cited by examiner

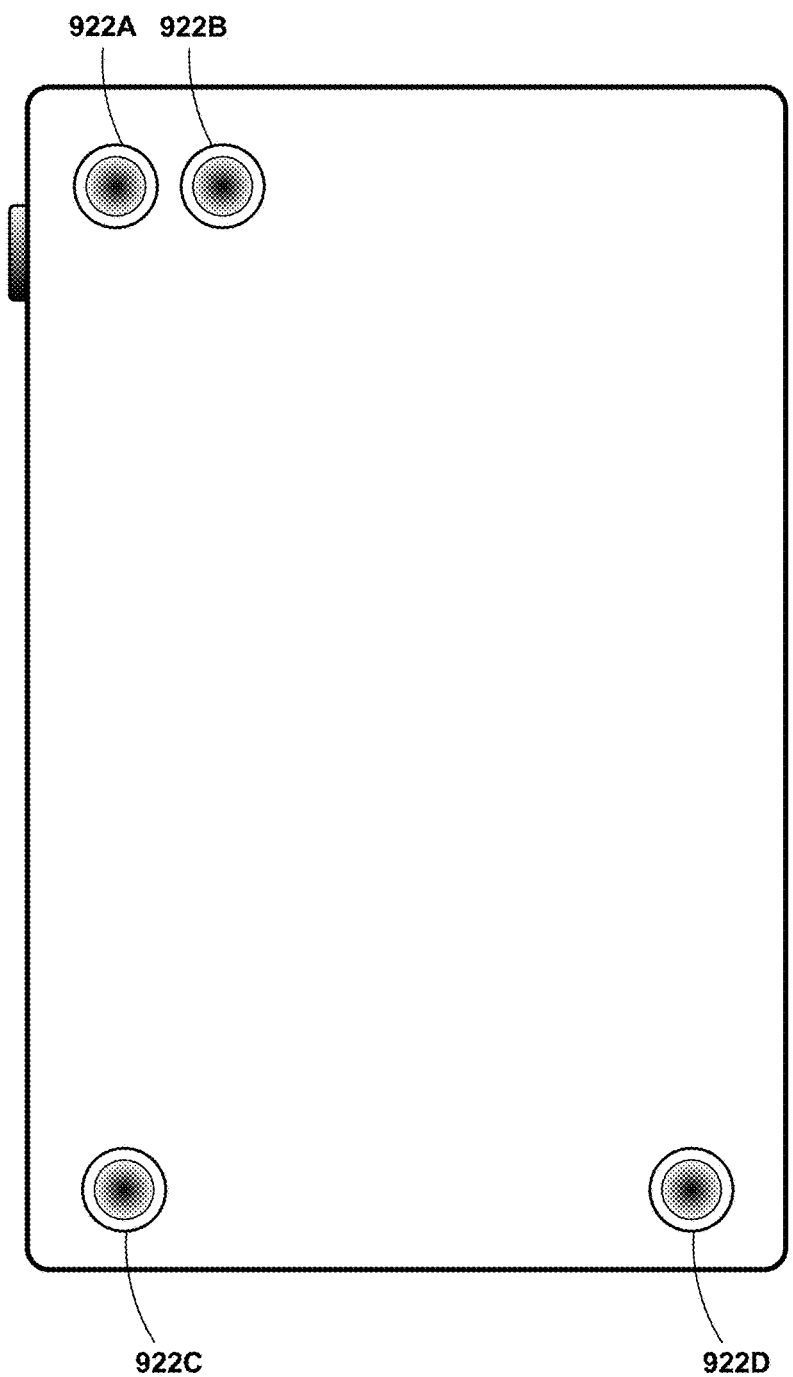

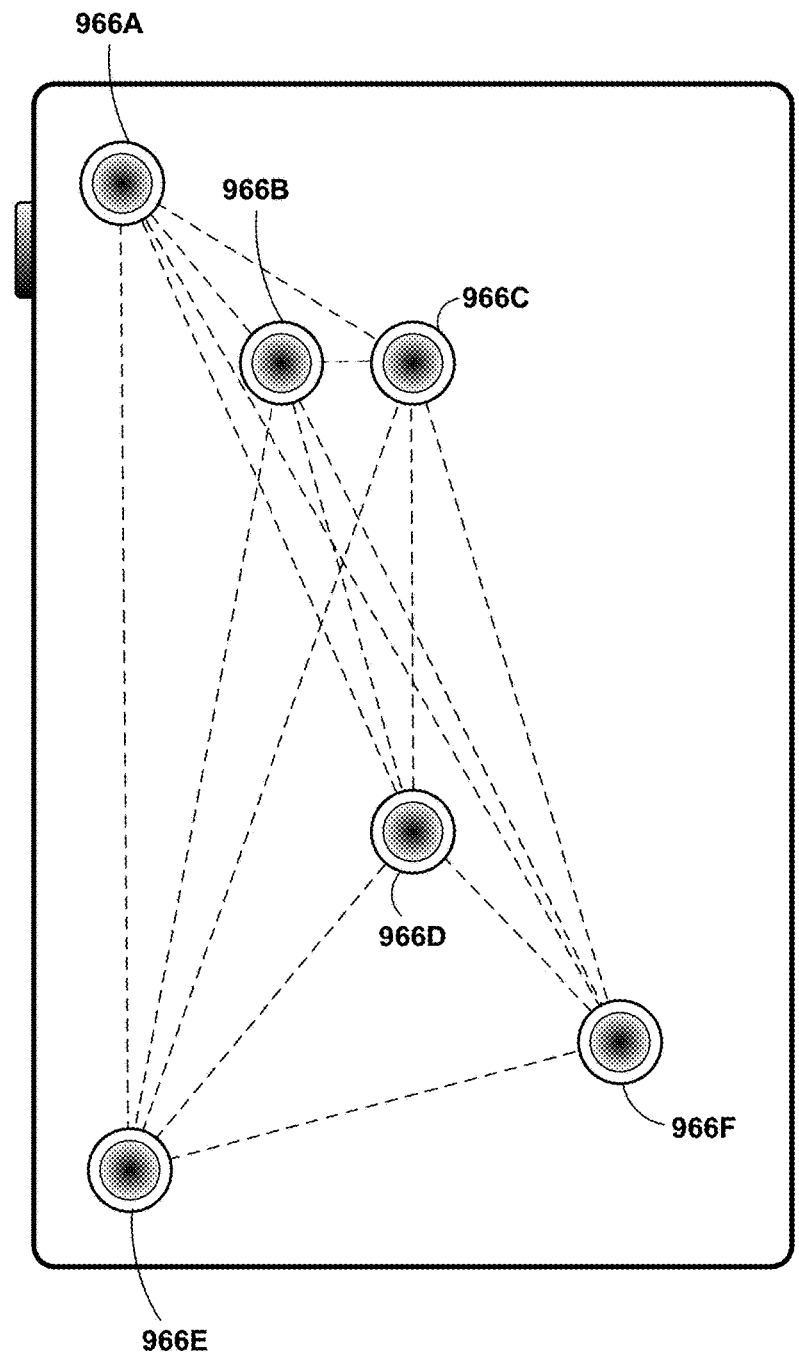

EFFICIENT DENSE STEREO COMPUTATION

BACKGROUND

Stereoscopic imaging typically involves capturing at least two images of a scene from two or more different perspectives (e.g., with parallel optical axes that are offset from each other by some distance), such that the images provide depth information about the scene. For example, the images could be taken using two cameras having optical axes that are substantially parallel, which are separated horizontally (relative to a horizon of the scene) by a distance that may be referred to as the "baseline." An individual image generated by stereo imaging could include image data related to the contents of the scene (e.g., the color, shape, location perpendicular to the direction a corresponding perspective, or other properties of contents of the scene) while differences between two images generated by stereo imaging could be related to the location of the contents of the scene relative to the corresponding two perspectives.

Generally, differences between two images generated by stereo imaging can be related to the depth (i.e., the distance between contents of the scene and the corresponding perspective in a direction parallel to the orientation of the perspectives) of contents of the scene. For example, an object that is deeper in the scene (i.e., that is further away from the cameras) will generally appear at locations in the two images that are closer to one another within the image frame, than an object that is closer to the camera. As a specific example, an object that is very close to the two cameras (e.g., a few inches away) will appear at locations in the two images that are separated by a much greater distance, in the image frame, than an object that is far away (e.g., 10 feet or more).

SUMMARY

The ability to quickly determine depth information for a scene may be beneficial in various applications. For example, a robot or other autonomous object could use determined depth information about obstacles in an environment in order to navigate the environment while avoiding the obstacles. In another example, determined depth and/or location information could be used to map the environment and/or to map the shape of one or more objects in the environment. Further applications include but are not limited to image processing, augmented reality, human interfaces, logistics, and biometrics.

Stereoscopic imaging could be employed to capture two or more images of the environment to produce one or more stereo image pairs of the environment. A relative distance (i.e., a disparity) between the location of an object in a first image of the stereo image pair and the location of the object in a second image of the stereo image pair could be related to the distance between the object and the imaging device used to generate the stereo image pair. The disparity of a stereo image pair, or of subsections or elements of one or both images of a stereo image pair (e.g., of individual pixel locations within an image of the stereo image pair), could be determined by a variety of methods. Methods described herein could allow for the determination of disparity values for a plurality of pixel locations of an image of a stereo image pair (e.g., for every pixel of the image) an order of magnitude faster than other methods currently in use for determining such disparity values.

In a first aspect, a method includes a computing system: (a) receiving a first image of a scene and a second image of the scene; (b) determining a disparity loss function for each of a plurality of pixel locations in the first image, wherein the disparity loss function for a given pixel location in the first image indicates variation in color-space similarity between: (i) the pixel location in the first image and (ii) a corresponding range of pixel locations in the second image; (c) associating each of the plurality of pixel locations with one or more of a plurality of vertices in a vertex space, wherein the vertex space comprises two spatial dimensions and at least one color-space dimension; (d) for each vertex in the vertex space, determining a vertex-disparity loss function based on the disparity loss functions corresponding to the associated pixel locations from the first image; (e) applying the determined vertex-disparity loss functions to determine a respective disparity value for each of the plurality of vertices; and (f) for each of the pixel locations in the first image, using the determined disparity value of each of one or more vertices that are associated with the pixel location as a basis to determine a disparity value for the pixel location in the first image.

In a further aspect, a non-transitory computer readable medium has stored therein instructions executable by a computing system to cause the computing system to perform functions including: (a) receiving a first image of a scene and a second image of the scene; (b) determining a disparity loss function for each of a plurality of pixel locations in the first image, wherein the disparity loss function for a given pixel location indicates variation in color-space similarity between: (i) the pixel location in the first image and (ii) a corresponding range of pixel locations in the second image; (c) associating each of the plurality of pixel locations with one or more of a plurality of vertices in a vertex space, wherein the vertex space comprises two spatial dimensions and at least one color-space dimension; (d) for each vertex in the vertex space, determining a vertex-disparity loss function based on the disparity loss functions corresponding to the associated pixel locations from the first image; (e) applying the determined vertex-disparity loss functions to determine a respective disparity value for each of the plurality of vertices; and (f) for each of the pixel locations in the first image, using the determined disparity value of each of one or more vertices that are associated with the pixel location as a basis to determine a disparity value for the pixel location in the first image.

In another aspect, a system includes: (a) two or more image capture systems that are oriented in substantially the same direction; and (b) a control system configured to: (i) operate a first image capture system of the two or more image capture systems to capture a first image of a scene; (ii) operate a second image capture system of the two or more image capture systems to capture a second image of a scene; (iii) determine a disparity loss function for each of a plurality of pixel locations in the first image, wherein the disparity loss function for a given pixel location in the first image indicates variation in color-space similarity between: (1) the pixel location in the first image and (2) a corresponding range of pixel locations in the second image; (iv) associate each of the plurality of pixel locations with one or more of a plurality of vertices in a vertex space, wherein the vertex space comprises two spatial dimensions and at least one color-space dimension; (v) for each vertex in the vertex space, determine a vertex-disparity loss function based on the disparity loss functions corresponding to the associated pixel locations from the first image; (vi) apply the determined vertex-disparity loss functions to determine a respective disparity value for each of the plurality of vertices; and (vii) for each of the pixel locations in the first image, use the determined disparity value of each of one or more vertices that are associated with the pixel location as a basis to determine a disparity value for the pixel location in the first image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 9B shows a digital camera device with an arrangement of four cameras oriented in the same direction, in accordance with an example embodiment.

FIG. 9C shows another digital camera device with an arrangement of four cameras oriented in the same direction, in accordance with an example embodiment.

FIG. 9D shows a digital camera device with an arrangement of six cameras oriented in the same direction, in accordance with an example embodiment.

DETAILED DESCRIPTION

Figure 1A:
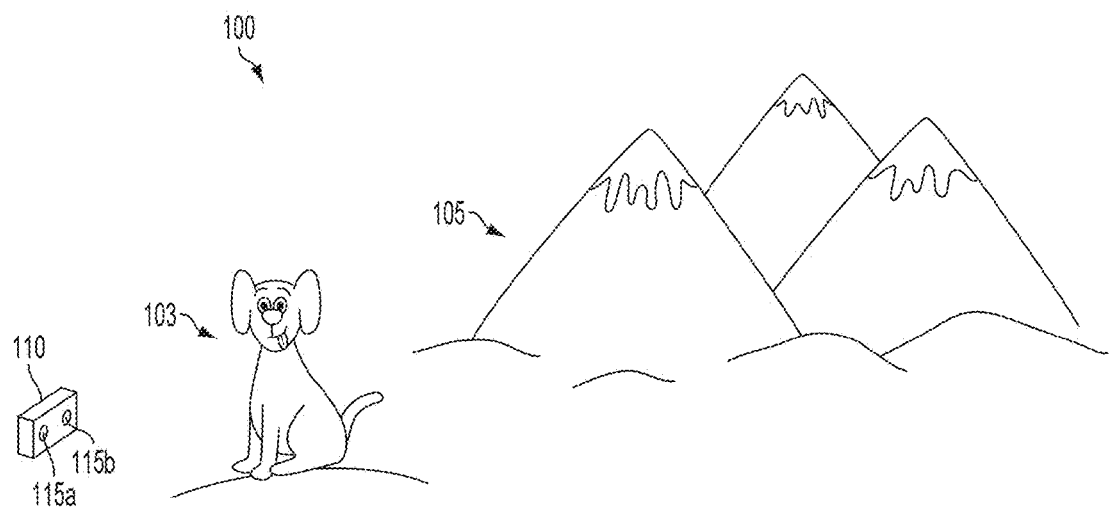
FIG. 1A depicts contents of an example scene being imaged by a camera device.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations, all of which are contemplated herein.

I. Overview

Example embodiments may help to determine depth and/or other location information for a scene in a more efficient manner. In particular, depth, disparity, and/or other location information may be determined for the contents of a scene (e.g., objects, obstacles, surfaces) based on two or more images of the scene.

The ability to quickly determine depth information for a scene may be beneficial in various applications. For example, a robot or other autonomous object (e.g., a drone, or a self-driving car) could use determined location information about obstacles in an environment in order to navigate the environment while avoiding obstacles. In another example, determined depth and/or location information could be used to map the environment and/or to map the shape of one or more objects in the environment. Further applications include but are not limited to image processing (e.g., performing image processing selectively on regions of an image corresponding to objects within a specified depth range), augmented reality (e.g., providing depth cues, assisting in navigation), human interfaces (e.g., determining the location of parts of a user's body and using the determined locations to control the operation of a computer or other system), logistics (e.g., determining the location and size of boxes, packages, or other objects in a transport vehicle, container, loading zone, warehouse or other environment), biometrics (e.g., determining a depth-based mapping of a person's face or other body part and comparing the determined mapping to a database of stored mappings corresponding to identified users), and determining the location of a device (e.g., matching an image-determined mapping to a region of a known environment). Of course, it should be understood that the benefits and uses of example embodiments described herein are provided for explanatory purposes, and should not be construed as limiting the scope of the invention.

In some examples, stereoscopic imaging may involve capturing two or more images of the environment from two or more perspectives that are generally oriented in substantially the same direction and separated by a specified distance. A pair of images captured in this manner may be referred to as a "stereo image pair."

Within a stereo image pair, the distance between the image-frame location of an object in the first image and the image-frame location of the same object in the second image is related to the distance between the object and the stereo imaging device used to capture the stereo image pair. This distance is referred to herein as the disparity of the object and/or of the location (e.g., a pixel location) of the object within the image-frame of the first or second images. For example, an object far from a stereo imaging device could appear in areas of the stereo image pair that are substantially overlapping (e.g., that have a displacement and/or disparity of approximately zero). On the other hand, an object near the stereo imaging device will typically have image-frame locations in a stereo image pair that are offset from each other by a distance (i.e., that have a positive disparity) that is inversely proportional to the distance from the stereo imaging device.

The disparity of a stereo image pair, or of subsection or elements of one or both images of a stereo image pair (e.g., of individual pixel locations, of specified pixel regions of an image, and/or of particular objects in the image), could be determined by a variety of methods. In some examples, a disparity value may be determined for each of a plurality of points and/or regions in a first image using the first image and a second image. This determination could include minimizing a cost function that takes as an input a plurality of disparity values corresponding to the plurality of points, pixels, regions, or other aspects of the first image. Such a cost function could include terms relating to the smoothness of the determined plurality of disparity values (i.e., to an overall degree of similarity between determined disparity values corresponding to respective points, pixels, regions, or other aspects of the first image that are proximate or in some way related (e.g., that are nearby in an X-Y space of the first image, that are similar in color and/or brightness, or some other metric or combination of metrics)).

Such a cost function could additionally include terms relating to the degree of correspondence (e.g., a similarity of color and/or brightness) between an aspect of the first image (i.e., of a reference image) and an aspect of the second image of the stereo image pair (i.e., of a matching image) having a location in the second image corresponding to the location of the aspect in the first image offset by a corresponding determined disparity. For example, the cost function could include a sum of disparity loss functions for each pixel in the first image, where the disparity loss function for a given pixel indicates the variation in color-space similarity (e.g., a similarity of the color, brightness, etc.) between the given pixel in the first image and pixels of the second image located over a range of distances (e.g., a range of disparities) relative to the location of the given pixel in the first image.

The disparity value for each point (e.g., for each pixel location) in a first image relative to a second image may be determined in a variety of ways. In some examples, the process of determining disparity values for pixels of the first image could be simplified by associating pixels of the first image into groups (e.g., by determining the extent of objects in the first image (e.g., using edge detection or other image processing techniques)), with determined or specified features (e.g., specified blocks of the image, vertices in a space into which the pixels could be embedded), or according to some other method.

For example, each pixel in the first image could be associated with one or more vertices in a vertex space. The vertex space could have two spatial dimensions (e.g., spatial dimensions corresponding to the two spatial dimensions of pixel locations within the frame of the first image) and at least one color-space dimension (corresponding to the color, brightness, color-specific brightness, or properties of the first image represented by the pixels of the first image). For example, the first and second images could be black-and-white images, and the vertex space could have two spatial dimensions corresponding to the location of pixels within the frame of the first image and a third color-space dimension corresponding to the brightness of the pixels in the first image. Thus, each pixel of the first image could have a location in the vertex space based on the location of the pixel within the frame of the first image and the brightness of the pixel. Individual pixels could then be associated with one or more vertices based on proximity to the vertices in the three-dimensional vertex space.

A vertex-disparity loss function could be determined for each of the vertices based on the disparity loss functions of the zero or more pixels associated with each of the vertices. The vertex-disparity loss functions could then be applied to determine respective vertex disparity values for each of the vertices. For example, a cost function that receives the set of determined vertex disparity values and that includes a sum of the vertex-disparity loss functions could be minimized (e.g., by gradient descent). Such a cost function could additionally include a smoothness term related to the similarity between individual determined disparity values.

To illustrate such a smoothness term or constraint, two example vertices in a vertex space are proximate in the vertex space or related in some other way. For example, two sets of pixels corresponding respectively to the two example vertices could be close within the frame of the first image and/or have a similar brightness or color. A smoothness term could return a higher cost value when first and second vertex disparity values corresponding to the two example vertices are dissimilar (i.e., have different values) than when the first and second vertex disparity values are similar.

The number of dimensions in the vertex space could vary, depending upon the particular application. In some examples, disparity values could be determined for black-and-white images, or for images that have been processed to be black-and-white (e.g., by determining a brightness value for pixels of the image(s) based on color information of the pixels, e.g., by summing the red, green and blue light intensities of the pixel to determine an overall brightness value for the pixel). In such examples, the vertex space could have two spatial dimensions corresponding to the location of pixels within the frame of the image(s) and a third color-space dimension corresponding to the brightness of the pixels.

In other examples, disparity values could be determined for color images (e.g., for images whose pixels define colors in a color-space, e.g., a red-green-blue (RGB) color space). A vertex space corresponding to such an example could have two spatial dimensions corresponding to the location of pixels within the frame of the image(s). The vertex space could have a further three color-space dimensions corresponding to the location, in the color-space, of colors defined by the pixels of the image(s).

In a further aspect, higher- or lower-dimensional vertex spaces could be used for images whose pixels define more or less color information. For example, a vertex space having one fewer color-space dimension (i.e., two color-space dimensions) could be used for image(s) whose pixels only define colors in a two-dimensional color-space (e.g., a red-green color-space, a red-near-infrared color-space). In other examples, a vertex space could have more than three color-space dimensions for use with image(s) whose pixels define colors in a higher-dimensional color-space (e.g., a color-space defined to represent the output of detectors of a hyperspectral imager)) or that define other information (e.g., the direction and/or degree of polarization of light in the image(s)).

The locations of the vertices in the vertex space could span a volume in the vertex space that is spanned by the pixels of a first (i.e., reference) image. For example, the vertex space could be three-dimensional (e.g., the first image could be black-and-white) and the vertices could span a volume in the two spatial dimensions of the vertex space corresponding to the extent of the frame of the first image and in the one-dimensional color-space dimension corresponding to the range of brightness values represented by the pixels of the first image.

Further, the locations of the vertices in the vertex space could be regularly spaced (e.g., to provide a uniform 'sampling' of the volume of the vertex space corresponding to the first image). For example, the vertices could be located in the vertex space at the vertices of a tessellated and/or regularly repeating array of three- or more-dimensional shapes or according to some other regular pattern. In some examples, the vertices could be located in a rectangular array (i.e., regularly spaced along orthogonal directions in the multi-dimensional space, at the vertices of a tessellated array of hyper-rectangles). In some examples, the vertices could be located in a triangular array (i.e., at the vertices of triangles, tetrahedra, or higher-dimensional simplexes that are regularly tessellated in the vertex space).

It should be understood that the above embodiments, and other embodiments described herein, are provided for explanatory purposes, and are not intended to be limiting.

II. Stereo Imaging and Disparity

Generally, imaging may refer to capturing and storing the color and brightness characteristics of a real-world environment or scene in a digital, chemical, or other format (e.g., in photographs and/or motion video). A large variety of image capture devices exist (e.g. CCDs, photodetector arrays, active pixel sensors) to facilitate capturing images in a host of different formats (e.g., color imaging, black and white imaging).

Stereo imaging includes capturing two or more images of the same scene, from two or more perspectives that are oriented in substantially the same direction, to produce a stereo image pair. Producing a stereo image pair could include operating a single image capture device to capture multiple images at respective multiple points in time and from respective multiple perspectives. Additionally or alternatively, producing a stereo image pair could include operating multiple image capture devices separated by a fixed or a variable distance and configured to capture respective multiple images simultaneously or at respective points in time. A pair of images of a scene corresponding to different perspectives of the scene may be referred to as stereo image data or as a stereo image pair.

Stereo image data may be used to produce one or more human-viewable stereo images, which may be referred to herein as a viewable stereoscopic image or 3D image. Additionally or alternatively, stereo image data may be analyzed to extract depth or other information about the scene. In particular, objects or points in the scene can be mapped in a three-dimensional (3D) coordinate system based on the stereo image data. For example, such a mapping could be based on a determined disparity between objects or points in two images of the scene.

Such mapping information determined from stereo image pairs could be used for a variety of different applications. Applications could include performing various image processing effects based on the determined mapping information (e.g., increasing or decreasing the apparent depth of objects in the image, applying a filter (e.g., a blur) to objects and/or regions of an image according to a determined depth or other location data about the objects and/or regions of the image). Mapping data could be used for navigation (e.g., to allow for navigation of robots and/or vehicles through an environment), augmented reality (e.g., mapping a scene to increase depth perception and accuracy), or other applications.

Depth information for a scene may be determined based on a stereo image pair of the scene. Such depth information may indicate the distance to various aspects in the scene from the image capture device that captured the stereo image pair. Such depth information could be determined for a plurality of pixels or groups of pixels in an image (e.g., for all objects and/or regions in an image of a scene generated by an image capture device) by assigning a depth value for each pixel of one or both of the images in a stereo image pair (i.e., by constructing a depth map). The depth of an object and/or region of a first image (e.g., a depth of a pixel of the image) could be determined based on a determined disparity of the object and/or region of the first image (herein referred to as the reference image) relative to a corresponding object and/or region of a second image (herein referred to as the matching image), where the reference image and the matching image form the stereo image pair. The disparity is related to the relative displacement of two points corresponding to the same object and/or region in respective two or more images of a scene containing the object and/or region.

The disparity between objects and/or regions in a scene could be determined based on the individual images in a stereo image pair in a variety of ways. The disparity could be determined for a number of different objects and/or regions of the reference or matching image (e.g., for each of a plurality of pixel locations (i.e., the locations of the pixels) of an image or for the locations of a subset of pixels of the image, for one or more specified subregions (e.g., pixel clusters, specified and/or determine bounded regions (e.g., bounded regions corresponding to individual discrete object in the image/scene) of the image, predetermined sectors or segments of an image) of an image, for a an image as a whole). The determination of a depth based on a disparity could include a variety of methods and/or algorithms (e.g., look-up tables, functions based on geometry (e.g., based on a separation between two or more cameras)).

FIG. 1A illustrates scene 100 containing near object 103 and distant object 105. FIG. 1A additionally illustrates a device 110 disposed proximate to the near object 103 and configured to generate images of the scene 100 (e.g., to generate a stereo image pair of the scene 100) among other functions. By way of example and without limitation, device 110 may be a cellular mobile telephone (e.g., a smartphone), a still camera, a video camera, a computer (such as a desktop, notebook, tablet, or handheld computer), a personal digital assistant (PDA), a home automation component, a digital video recorder (DVR), a digital television, a remote control, a wearable computing device, or some other type of device equipped with at least two image capture and/or image processing devices. It should be understood that device 110 may represent a discrete physical device such as a digital camera, a particular physical hardware platform on which a camera application operates in software, or other combinations of hardware and software that are configured to carry out camera functions.

Figure 1B:
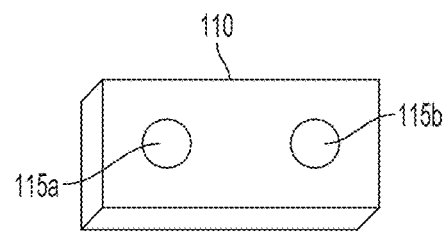
FIG. 1B depicts the camera device of FIG. 1A

Device 110 includes two image capture devices, reference imager 115a and matching imager 115b, which could be operated independently and/or collaboratively (i.e., by one or more controllers of the device 110 (not shown)). FIG. 1B provides a more detailed view of device 100, illustrating the disposition of the reference imager 115a and the matching imager 115b in the device 110. Reference imager 115a and matching imager 115b are separated by a specified distance such that the imagers 115a, 115b could be operated to capture respective images of the scene from respective perspectives. The imagers 115a, 115b are oriented such that the respective perspectives have orientations that are substantially in the same direction.

Figure 2A:
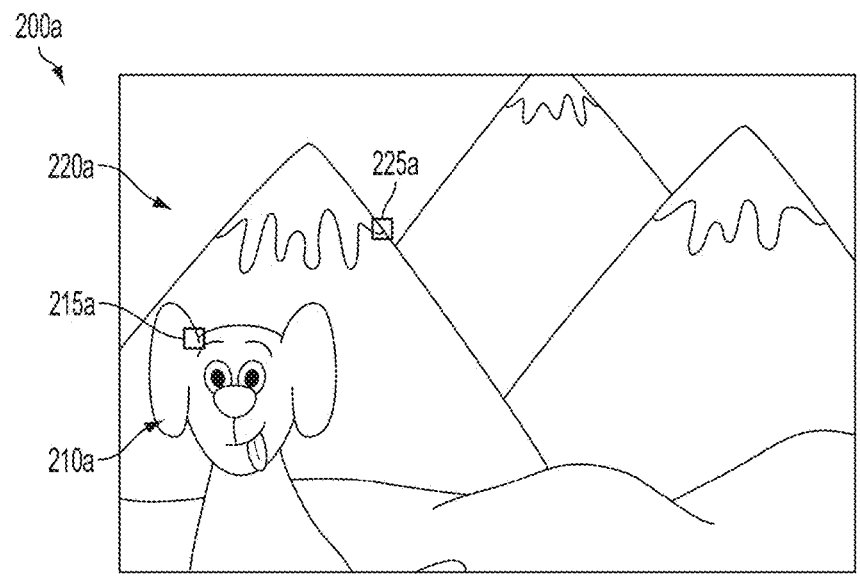
FIG. 2A is a first example image of the scene depicted in FIG. 1A as captured by a first camera of the camera device of FIGS. 1A and 1B.
Figure 2B:
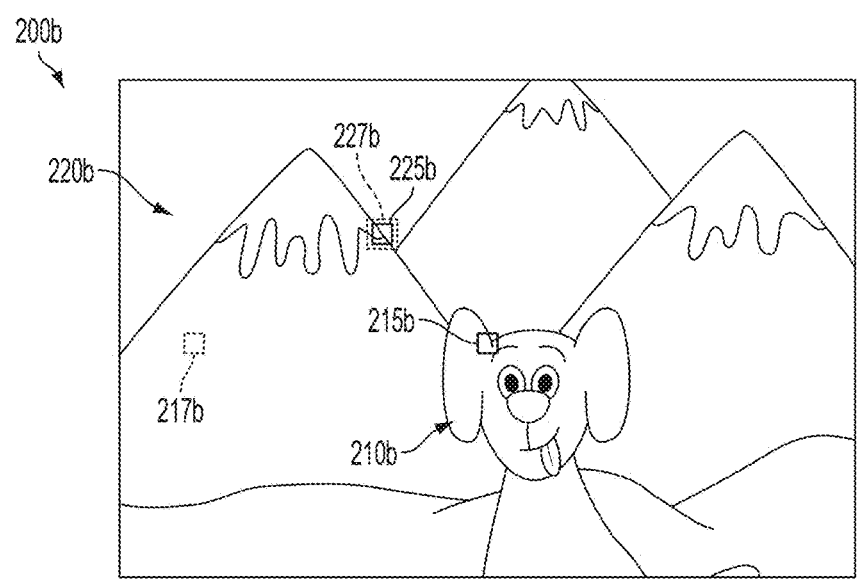
FIG. 2B is a second example image of the scene depicted in FIG. 1A as captured by a second camera of the camera device of FIGS. 1A and 1B.

FIG. 2A illustrates an example reference image 200a of the scene 100, including a reference near object image 210a and a reference distant object image 220a. The example reference image 200a could be generated by the reference imager 115a. FIG. 2B illustrates a matching image 200b of the scene 100, including a matching near object image 210b and matching distant object image 220b. The example matching image 200b could be generated by the matching imager 115b.

Images 200a and 200b could be used to determine a depth map based on determined disparity information relating to the images 200a, 200b. For example, disparity values for pixel locations of the reference image 200a could be determined based on the reference 200a and matching 200b images. Further, a depth map could be determined based on such determined disparity values. To illustrate disparity in the context of the example images 200a, 200b, 215a and 215b illustrate the location of pixel locations within the reference 200a and matching 200b images, respectively, corresponding to images (i.e., aspects of 210a, 210b, respectively) of the same portion of the near object 103. The location within the frame of the matching image 200b corresponding to the location of 215a within the reference image 200a is illustrated by 217b. Similarly, 225a and 225b illustrate the pixel locations within the reference 200a and matching 200b images, respectively, corresponding to images (i.e., aspects of 220a, 220b, respectively) of the same portion of the distant object 105. The location within the frame of the matching image 200b corresponding to the location of 225a within the reference image 200a is illustrated by 227b.

Note that distant object images 220a, 220b are substantially coincident (i.e., have a disparity of substantially zero, as illustrated by the overlapping of 225b and 227b) due to the distance of the distant object 105 relative to the device 110. Due to the proximity (e.g., relative to a baseline length of cameras of the device 100 or other properties of the device 100) of the near object 103 relative to the device 110, near object images 210a, 210b are displaced relative to each other by a disparity. The disparity between the near object images 210a, 210b is related to the distance illustrated by the difference the locations of 215b and 217b.

Disparity could be specified in a variety of ways, e.g., a number of pixel widths, a fraction of the width of one or both of the frames of the images 200a, 200b, an angular difference, or by some other method. Disparity could be measured or determined as a discrete value (e.g., a number of pixel-widths of displacement between a first pixel location in the first image corresponding to an object in the scene and a second pixel location in the second image corresponding to the object in the scene) or as a continuous value.

Figure 3:
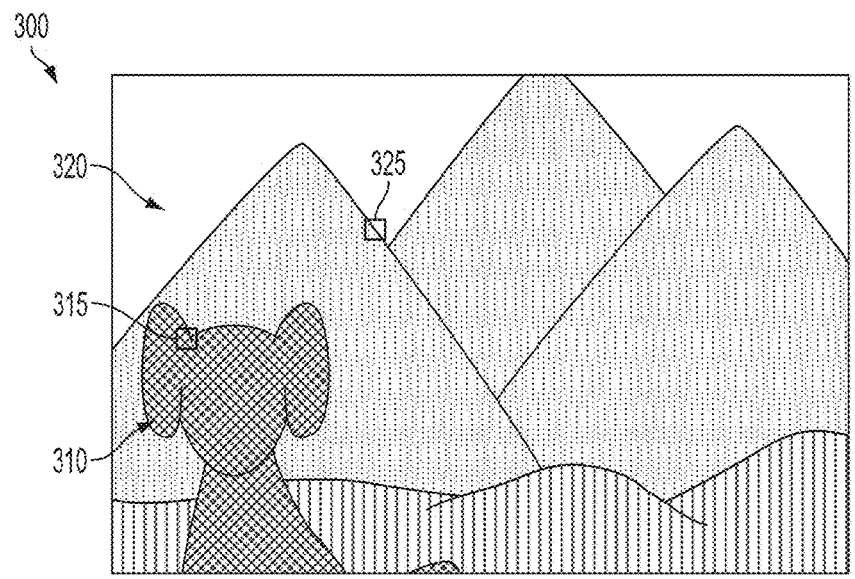
FIG. 3 depicts an example disparity map that could be determined from the example images of FIGS. 2A and 2B.

A disparity value could be determined for a plurality of points in one or both of the images 200a, 200b. For example, a disparity could be determined for every pixel location of the reference image 200a to generate a disparity map. FIG. 3 illustrates an example disparity map 300 corresponding to the reference image 200a. Within image 300 there are simplified depth map representations of objects in the images 200a, 200b, with a disparity between image 210a and image 210b being represented by near object disparity image 310 (e.g., the illustrated portion 315 of the near object disparity image 310 could be related to the disparity between 215a and 215b, e.g., to a determined distance between 215b and 217b). Similarly, a disparity between image 220a and image 220b is represented by distance object disparity image 320 (e.g., the illustrated portion 325 of the distant object disparity image 320 could be related to the disparity between 225a and 225b, e.g., to a determined distance (e.g., a coincidence or distance of zero) between 225b and 227b).

The location of images (e.g., the extent and positioning of near object disparity image 310) within the frame of the disparity map 300 corresponds to the location of images within the frame of the reference image 200a (e.g., to the extent and positioning of near object image 210a). The grayscale color of a given aspect of the disparity map 300 corresponds to a determined and/or measured disparity of an aspect of the reference image 200a that is at the same location within the frame of the reference image 200a as the location of the given aspect of the disparity map 300 within the frame of the disparity map 300. For example, the grayscale color of the disparity map 300 at 315 corresponds to the determined and/or measured disparity between 215a and 215b (e.g., to a determined distance between 215b and 217b). In the example disparity map 300 of FIG. 3, regions that are darker (e.g., black) indicate greater disparities and regions that are lighter (e.g., white) indicate lesser disparities (e.g., a white region could indicate a disparity of zero).

Depth information (e.g., a depth map) may be determined from disparity information (e.g., from the disparity map 300). As such, the disparity information may be utilized to generate a depth map of the scene. The depth map may then be used help determine focus settings for the scene, to determine the location of objects in the scene, to map the scene, to navigate the scene (e.g., to operate a robot or other autonomous device to move through the scene) and/or may be used for other purposes.

Given a disparity value corresponding to a particular object and/or to a pixel location of an image of the object, as well as information about the configuration of the stereo imaging device 100 used to capture the stereo image pair (e.g., a separation distance between imagers 115a, 115b, a pixel pitch of image sensors of the imagers 115a, 115b, a focal length of optics of the imagers 115a, 115b, a field-of-view of the imagers 115a, 115b), a distance from the device 100 (e.g., a depth) to the particular object could be calculated. Such a calculation could be performed in a variety of ways.

In some examples, such a calculation could include using a lookup table to determine a depth value based on a determined and/or measured disparity value. In some examples, a model of the device 100 (e.g., a model of the imagers 115a, 115b) could be used to determine a depth based on a disparity and information about the device 100 (e.g., a separation distance between the imagers 115a, 115b). Such a model-based approach could allow depth values to be determined for a variety of different configurations of the device 100. For example, a separation distance between the imagers 115a, 115b could be variable, and the separation distance could be controlled to allow for some application (e.g., to allow for high-accuracy determination of the depth of certain objects in a scene by controlling the separation distance between the imagers 115a, 115b). Other applications of determined disparity information for a scene and/or one or more pairs of images of a scene are anticipated.

Other operations could be performed based on determined disparity information for one or more images. In some examples, image processing could be performed on aspects of an image based on determined disparity and/or depth information corresponding to the aspects of the image. For example, regions of an image having determined disparity and/or depth values outside of a specified range could be blurred or otherwise filtered or processed (e.g., to simulate an image that could be created by a camera having a more limited depth of focus than the imagers used to create a stereo image pair (e.g., 115a, 115b)). Additionally or alternatively, the size, location, color balance, contrast, or other properties of aspects of an image could be altered based on a determined disparity and/or depth value. In some examples, the distance to an object in a scene could be determined based on a determined disparity of image(s) of the object, and a focus (e.g., a configuration of optics, a focal length of one or more lenses) of an imager (e.g., an imager used to create part of a stereo image pair used to determine the determined disparity) could be adjusted based on the determined distance such that the object can be imaged in-focus. Other applications of disparity values determined based on stereo image pairs are anticipated.

III. Calculating Disparity Values Based on Stereo Image Pairs

Calculating disparities based on stereo image pairs could be a computationally expensive process. The process of determining disparities based on digital images could include performing calculations to determine a disparity value for each point (e.g., each pixel location) within a first image of a stereo image pair. Such a determination could include comparing properties of a given point (e.g., color, location) to a set of corresponding points in a second image of the stereo image pair. The set of corresponding points of the second image could be points across a range of distances from a location within the second image corresponding to the location of the given point within the first image, e.g., points in the second image having displacements within a specified range relative to the location of the given point.

Determination of a plurality of disparity values for a corresponding plurality of points in an image could include determining a disparity loss function for each of the plurality of points. A disparity loss function for a given pixel location of a first image could take as an input a disparity value and could be related to a degree of similarity between the given pixel location (e.g. a similarity of color, brightness, or some other pixel property) and a pixel location of a second image that is displaced from the given pixel location, within the second image, by a distance equal to the input disparity value. The disparity loss function for a given pixel location could be defined for a range of pixel locations in the second image; for example, the disparity loss function for a given pixel location could be defined for a range of distances between zero (i.e., comparison between the given pixel location and a pixel location of the second image having the same location as the given pixel location, within the frame of the second image) and some defined upper bound (e.g., a distance between the given pixel location and the edge of the second image, such that the disparity loss function describes the similarity between the given pixel location and a range of pixel locations of the second image at or to one direction (e.g., the right) of the given pixel location, in the second image)).

Figure 4A:
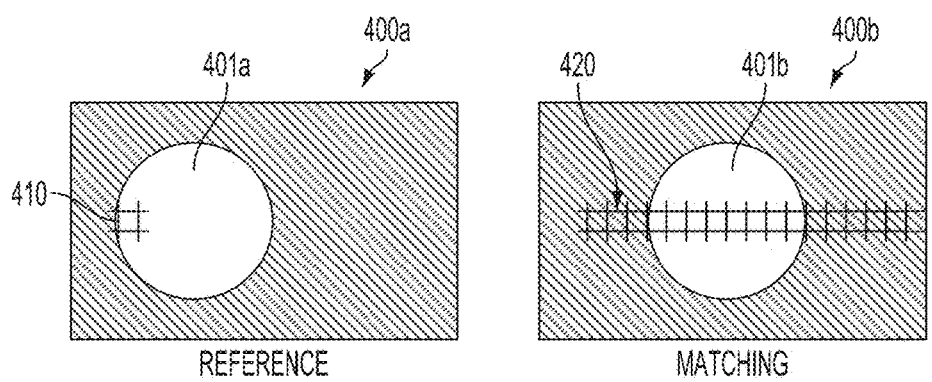
FIG. 4A depicts pixel locations of first and second example images.

To illustrate disparities between pixel locations and to further illustrate disparity loss functions of pixel locations, FIG. 4A illustrates reference 400a and matching 400b example images that contain first 401a and second 401b images, respectively, of an object in an imaged scene. The imaged scene includes a light-colored ball against a dark-colored background. The image of the ball is displaced between the reference 400a and matching 100b images due to the ball being close to an imaging device (not shown) used to image the scene and to generate the images 400a, 400b. A given pixel location 410 of the reference image 400a within the frame of the reference image 400a is illustrated in FIG. 4A. A corresponding matching set of pixel locations 420 of the matching image 400b is also illustrated. The matching set of pixel locations 420 includes all of the pixel locations of the matching image 400b at and/or to the right of the given pixel location 410, within the frame of the matching image 400b.

A variety of disparity loss functions could be determined and/or defined for the given pixel location 410 of the reference image 400a based on a similarity between the given pixel location 410 and the matching set of pixel locations 420 of the matching image 400b. A disparity loss function could be related to a similarity between the color, brightness, or other property of the given pixel location 410 and the corresponding property of individual pixel locations of the matching set of pixel locations 420. A disparity loss function could be related to a similarity between the color, brightness, or other property of the given pixel location 410 and subsets of the matching set of pixel locations 420 (e.g., input disparities to the disparity loss function corresponding to a contiguous string of 'green' pixel locations in the set of matching pixel locations 420 could be result in identical outputs of the disparity loss function). The output of the disparity loss function could be continuous-valued or discrete-valued (e.g., output value '0' for pixel locations of the matching set of pixel locations 420 that are more similar to the given pixel location 410 than a specified threshold, output value '1' otherwise).

Figure 4B:
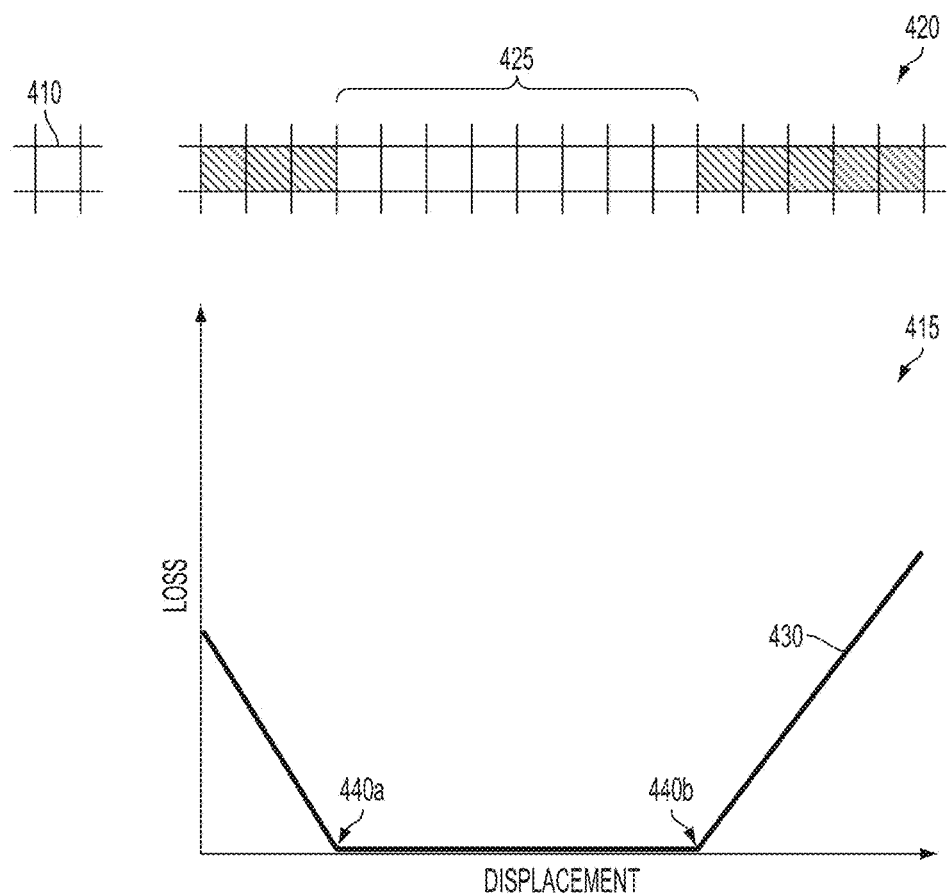
FIG. 4B depicts an example disparity loss function related to a similarity between a given pixel location of the first image of FIG. 4A and pixel locations of the second image of FIG. 4A.

FIG. 4B illustrates an example disparity loss function 430 for the given pixel location 410 relative to the matching set of pixel locations 420. The example disparity loss function 430 is plotted such that the input displacement of the example disparity loss function 430 is vertically aligned below a copy of the matching set of pixel locations 420. A section of the copy of the matching set of pixel locations 420 indicating the pixel locations corresponding to the image of the ball is illustrated as similar pixel locations 425. Similar pixel locations 425 are a string of contiguous pixel locations of the matching set of pixel locations 420 having a brightness (or other property, e.g., color) similar to the brightness (or corresponding other property) of the given pixel location 410. Other types of disparity loss functions for pixel locations of a first (e.g., reference) image of a stereo image pair relative to a second (e.g., matching) image of the stereo image pair are anticipated.

The example disparity loss function 430 is a hinge loss function; that is, the example disparity loss function 430 has a minimum value (e.g., zero) for input disparities corresponding to the location of the similar pixel locations 425 within the frame of the matching image 400b relative to the location of the given pixel location 410 within the frame of the reference image 400a. The extent of the input disparity values that result in this minimum output of the disparity loss function are specified by upper 440b and lower 440a hinge disparities. The output of the example disparity loss function 430 increases linearly for input disparities outside the range defined by the hinge disparities 440a, 400b. The example disparity loss function 430 could be mathematically described by the following equation:

$$f_i(d_i) = \max(0, d_i - u_i) + \max(0, l_i - d_i)$$

wherein $f_i(d_i)$ is the disparity loss function for the $i^{th}$ pixel location of a set of pixel locations, given an input disparity of $d_i$. The upper 440b and lower 440a hinge disparities are represented by $u_i$ and $l_i$, respectively, and max(x,y) indicates an operation to return the maximum of input arguments x and y.

The example disparity loss function 430 could be parameterized by additional factors. For example, the slope of the increasing portions of the example disparity loss function 430 could be specified. Hinge disparities and other parameters of a disparity loss function could be determined for each pixel location of the reference image 400a. Such a determination could be performed relative to one or more specified thresholds or other specified parameters.

For example, the extent of the hinge disparities for a particular pixel location of the reference image 400a could be determined based on the extent of a contiguous string of pixel locations in the matching image 400b that has a brightness, color, or other property that is within a specified threshold of the corresponding property of the particular pixel location. Alternatively, such thresholds or other parameters could be specified and/or determined for the particular pixel location based, e.g., on the properties of corresponding pixel locations of the matching image. For example, a specified brightness, color, or other property similarity threshold could be determined based on a variance or function of one or more properties of the pixel locations of the matching image.

Disparity values for individual pixel locations of a first (e.g., reference) image of a stereo image pair could be determined based on respective disparity loss functions of the individual pixel locations in a variety of ways. In some examples, the disparity values of individual pixel locations of the first image could be determined by performing an optimization using the determined disparity loss functions, e.g., by performing a gradient descent using a cost function that is based on the disparity loss functions (e.g., that comprises a weighted sum of the disparity loss functions of the pixel locations of the first image). In some examples, the disparity values of individual pixel locations of the first image could be determined independently of the determination of disparity values for other pixel locations of the first image. Alternatively, the disparity values of individual pixel locations of the first image could be determined in consideration of the disparity values of disparity values for other pixel locations of the first image.

For example, a cost function that includes a loss term related to the determined disparity loss functions of the pixel locations and that includes a smoothness term related to the similarity between individual determined disparity values (e.g., determined disparity values of neighboring pixel locations of the first image) could be minimized (e.g., by gradient descent, dynamic programming, or some other method) to determine disparity values for pixel locations of the first image.

An example cost function that includes a smoothness term (to the left of the addition symbol) and a loss term (to the right of the addition symbol) is described by the following equation:

$$\frac{1}{2} \sum_i \sum_j \hat{A}_{i,j}(d_i - d_j)^2 + \lambda \sum_i f_i(d_i)$$

wherein $f_i(d_i)$ is the disparity loss function for the $i^{th}$ pixel location of a set of pixel locations of a first image, given an input disparity of $d_i$. $\hat{A}_{i,j}$ is an affinity factor related to a specified smoothness cost for similarity between determined disparity values for the $i^{th}$ and $j^{th}$ pixel locations of the set of pixel locations of the first image. That is, a higher value for $\hat{A}_{i,j}$ will result in a higher cost for a given difference between a determined disparity $d_i$ of the $i^{th}$ pixel location and a determined disparity $d_j$ of the $j^{th}$ pixel location. $\lambda$ is a weighting factor that can be specified to set a relative importance of the smoothness term and the loss term in determining the overall cost of a given set of determined disparity values d (wherein the $i^{th}$ element of d is $d_i$, the determined disparity value for the $i^{th}$ pixel location of the first image).

The affinity factors $\hat{A}_{i,j}$ could be chosen such that the smoothness cost for similarity between determined disparity values for the $i^{th}$ and $j^{th}$ pixel locations of the set of pixel locations of the first image is related to proximity between the $i^{th}$ and $j^{th}$ pixel locations within the frame of the first image. For example, the smoothness cost for similarity could be related to an exponential or other function of the distance, within the frame of the first image, between the $i^{th}$ and $j^{th}$ pixel locations. Additionally or alternatively, the smoothness cost for similarity could be zero for pairs of $i^{th}$ and $j^{th}$ pixel locations that are more than a specified distance away from each other or according to some other criterion. For example, the smoothness cost for similarity could be zero for pairs of $i^{th}$ and $j^{th}$ pixel locations that are not adjacent. In such a scenario, $\hat{A}$ could be a sparse matrix, as the $\hat{A}_{i,j}$ corresponding to pairs of $i^{th}$ and $j^{th}$ pixel locations that are not adjacent would be zero. The affinity factors $\hat{A}_{i,j}$ could be chosen such that the smoothness cost for similarity between determined disparity values for the $i^{th}$ and $j^{th}$ pixel locations of the set of pixel locations of the first image is related to some other property or properties of the pixel locations (e.g., a similarity between a brightness, a color, or some other property or properties of the pixel locations).

The affinity factors $\hat{A}_{i,j}$ could be chosen such that the smoothness cost for similarity between determined disparity values for the $i^{th}$ and $j^{th}$ pixel locations of the set of pixel locations of the first image is related to a similarity in space (e.g., to proximity between pixel locations in the frame of the first image) and similarity in color-space (e.g., to a proximity in red-green-blue (RGB) or some other color-space representation of the color of the pixel locations) of the pixel locations. For example, the affinity factors $\hat{A}_{i,j}$ could be Gaussian potentials between all pairs of pixel locations defined in a five-dimensional XYRGB (e.g., location (XY) within the frame of the first image and color-space representation (RGB)) space (related, e.g., to bilateral filters):

$$A_{i,j} = \left( \frac{([x_i, y_i] - [x_j, y_j])^2}{2\sigma_{xy}^2} + \frac{([r_i, g_i, b_i] - [r_j, g_j, b_j])^2}{2\sigma_{rgb}^2} \right)$$

wherein $x_i$, $x_j$ represent the horizontal location of the $i^{th}$ and $j^{th}$ pixel locations, respectively, within the frame of the first image and $y_i$, $y_j$ represent the vertical location of the $i^{th}$ and $j^{th}$ pixel locations, respectively, within the frame of the first image. Further $r_i$, $g_i$, $b_i$ represent the red, green, and blue intensities, respectively, of the $i^{th}$ pixel location and $r_j$, $g_j$, $b_j$ represent the red, green, and blue intensities, respectively, of the $j^{th}$ pixel location. $\sigma_{xy}^2$ is a scaling factor for location within the frame of the first image and $\sigma_{rgb}^2$ is a scaling factor for location within the RGB color-space within which the colors of the pixel locations are defined.

Note that other affinity factors $\hat{A}_{i,j}$ could be determined, specified, or otherwise used to determine a cost function or to otherwise determine a set of determined disparity values for pixel locations of a first image of a stereo image pair (or of some other pair of images for which disparity values can be determined for one or more pixel locations). For example, the affinity factors $\hat{A}_{i,j}$ could be determined based on Gaussian potentials defined in the XY space within the frame of the first image (e.g., using an equation similar to the equation above, but omitting the right term within the exponential). Other example functions, classes of functions, functionals, or other methods to determine and/or specify the affinity factors $\hat{A}_{i,j}$ are anticipated.

The affinity factors $\hat{A}_{i,j}$ could be chosen such that a matrix of the affinity factors $\hat{A}$ (i.e., a matrix whose $[i,j]^{th}$ element is $\hat{A}_{i,j}$) is symmetric and bistochastic (i.e., such that $\hat{A}_{i,j}=\hat{A}_{j,i}$ and such that the such of each row of $\hat{A}$ sums to one and such that each column of $\hat{A}$ sums to one). For such a choice of affinity factors $\hat{A}_{i,j}$ the cost function could be reposed as:

$$d^T(I-\hat{A})d + \lambda \sum_i f_i(d_i)$$

wherein I is the identity matrix and the other symbols and factors are defined as above.

Additionally or alternatively, a matrix of chosen affinity factors A could be determined (e.g., according to a set of pixel-pairwise Gaussian potentials defined based on the distance between pairs of pixel locations in an XYRGB or other space as described above) and could be modified into a symmetric and bistochastic matrix $\hat{A}$ by pre- and post-multiplication by, e.g., a diagonal matrix D. That is, $\hat{A}$ and A could be related by the equation:

$$\hat{A}=DAD$$

wherein the diagonal matrix D could be determined by a variety of methods (e.g., the Sinkhorn method, or by some other method or methods). The use of symmetric and bistochastic affinity factors $\hat{A}$ could allow for more efficient computation of the smoothness term (e.g., by allowing for some simplification of one or more matrix multiplication or other procedures involved in, e.g., performing gradient descent using the cost function to determine a set of disparity values for pixel locations of an image).

Determination of a disparity value for each pixel location of a high-resolution image could be computationally expensive (due, e.g., to the total number of pixels in an image scaling roughly with the square of the image resolution). The computational effort (e.g., processor resources (e.g., MIPS), processor time) required to determine disparity values (e.g., a disparity map) for a given number of pixel locations (or other points or other features of an image) can be related to the number of pixels in an exponential fashion. Thus, determining such sets of disparity values (and/or determining corresponding depth maps based on such) based larger and/or more detailed images can be intractable given finite computational resources and/or finite available time for computation (e.g., the limited computational resources of a mobile device).

In response, a number of methods could be employed to simplify the task of determining disparity values for pixel locations of an image. In some examples, disparity values could be determined in a first step for a subset of pixel locations of an image (e.g., for a regularly spaced subset of pixel locations within an image) and the determined disparity values could be interpolated for pixel locations of the image that are not in the subset of pixel locations for which disparity values were determined in the first step. In some examples, a first image could be blocked or otherwise partitioned (e.g., in regular blocks, or according to areas corresponding to determined objects within the image, e.g., by some image processing) and individual disparity values could be determined for individual blocks or other partitions.

In some examples, vertex-disparity loss functions could be determined for a plurality of vertices in a vertex space, based on a plurality of disparity loss functions of pixel locations in the first image. Such a determination of vertex disparity values could include minimizing a cost function that includes a smoothness term related to a similarity (e.g., a proximity in the vertex space) between pairs of vertices and/or a similarity (e.g., a proximity in the vertex space and/or within the frame of the first image, a similarity in a color-space) between pixel locations associated with pairs of vertices.

IV. Embedding Stereo Image Data in a Vertex Space and Example Vertex Spaces

Pixel locations of an image (e.g., a first image of an image pair) could be associated with vertices in a vertex space. The association could be based on a proximity or other relationship within the vertex space between the pixel locations and the vertices (e.g., a given pixel location could be associated with the nearest vertex within the vertex space, or with a set of vertices (e.g., a set of vertices defining the vertices of a shape in the vertex space that encloses the given pixel location)). The vertex space could have spatial dimensions (e.g., dimensions corresponding to horizontal and vertical dimensions of the location of pixel locations within the image) and one or more color-space dimensions (e.g., dimensions corresponding to the brightness, color, red, green, or blue intensity, or other properties of the pixel locations within a color-space).

Based on an association between pixel locations of the image and vertices in the vertex space, a process related to the pixel locations (e.g., the determination of a set of disparity values of the pixel locations) could be simplified (e.g., performed in less time and/or by using less computational resources) by translating the process such that the process can be performed for the vertices (which could number substantially fewer than the pixel locations). The results of the process performed on the vertices (e.g., the determination disparity values for each of the vertices) could then be applied to the pixel locations (e.g., by interpolating or otherwise calculating disparity values for a particular pixel location of the image based on determined disparity values of vertices associated with the particular pixel location).

Figure 5A:
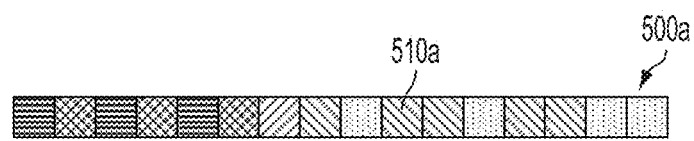
FIG. 5A depicts pixel locations of an example one-dimensional image.

To illustrate the association of pixel locations of an image with vertices in a vertex space, FIG. 5A depicts an example one-dimensional image 500a (i.e., a one-dimensional strip of pixel locations). Pixel locations of the image 500a (including given pixel location 510a) define respective brightnesses (i.e., individual pixel locations of the image 500a define colors within a one-dimensional (e.g., black-and-white) color-space).

Figure 5B:
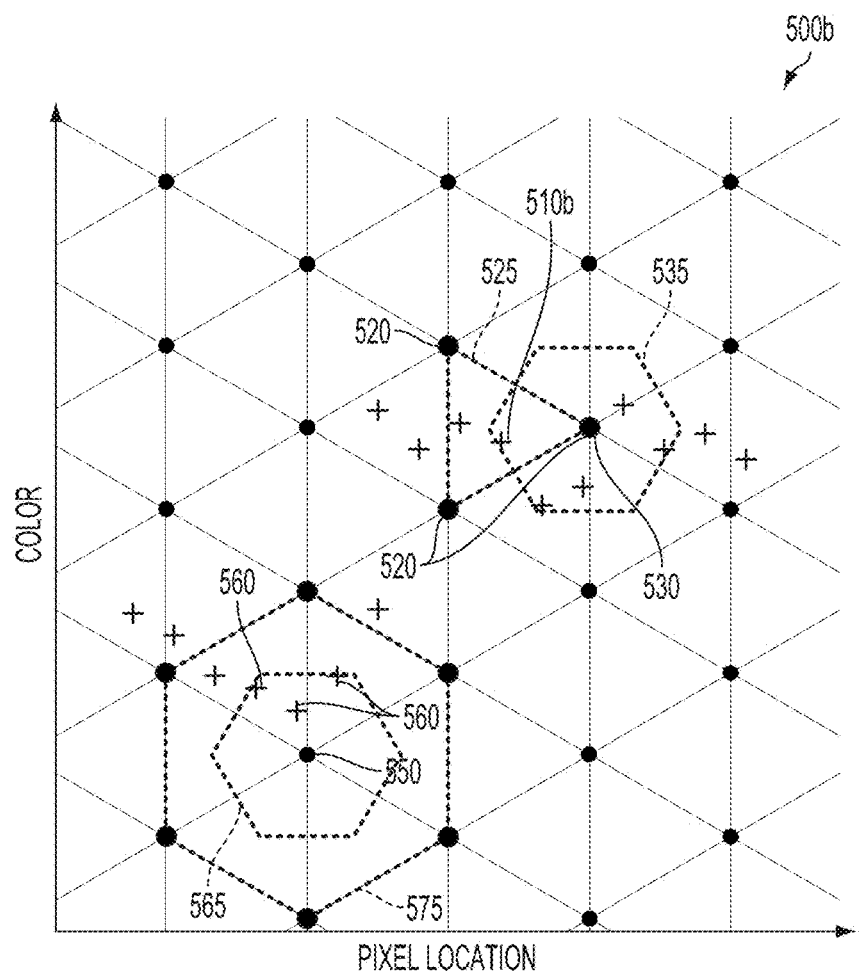
FIG. 5B depicts an example vertex space containing example vertices into which the pixel locations of FIG. 5A have been embedded.

FIG. 5B depicts an example two-dimensional vertex space 500b. The vertex space 500b includes a spatial dimension (labeled 'Pixel Location,' illustrated as the horizontal axis) corresponding to the location of the pixel locations of the image 500a within the one-dimensional 'frame' of the image 500a. The vertex space 500b additionally includes a color-space dimension (labeled 'Color,' illustrated as the vertical axis; brighter pixel locations are located in higher locations within the vertex space 500b). The location of the pixel locations of the image 500a within the vertex space 500b are indicated by crosses. A plurality of vertices are located in the vertex space 500b. The locations of the vertices are regularly spaced in the vertex space 500b in a triangular pattern and indicated by dots. The vertices within the vertex space 500b could be described as being at the location of vertices of a regularly-stacked (or tessellated) pattern of regular 2-simplexes (i.e., triangles).

The pixel locations of the image 500a could be associated with vertices within the vertex space 500b according to proximity or some other property of the relative location of the pixel locations and vertices within the vertex space 500b. In a first scheme of association of pixel locations with vertices, a given pixel location 510b in the vertex space 500b (corresponding to the given pixel location 510a of the image 500a) could be associated with three vertices 520 that define an enclosing triangle 525 that encloses an area (or more generally, a space of dimension equal to the number of dimensions of the vertex space) of the vertex space that contains the given pixel location 510b. In such an example association, the given pixel location 510b could be equally associated with each of the three vertices 520 or could be associated in a weighted fashion according to some function or other consideration. For example, the given pixel location 510b could be associated with individual vertices of the three vertices 520 according to respective distances in the vertex space 500b between the given pixel location 510b and the individual vertices (e.g., according to some barycentric partition or other assignment of the given pixel location 510b between the vertices of the three vertices 520).

Similarly, other pixel locations within the enclosing triangle 525 could be associated with the three vertices 520 (though the weighting of the association between a first pixel location within 525 and the three vertices 520 could be different from the weighting of the association between a second pixel location within 525 and the three vertices 520 according, e.g., to a difference in the location within the vertex space 500b of the first and second pixel locations). Conversely, under such an association scheme an example vertex 550 could be associated with pixel locations within a first example space 575. The first example space 575 could be defined as the set of enclosing triangles that include the first example vertex 550 as a vertex.

As an example of another scheme of association, the given pixel location 510b could be associated with a closest vertex 530 of the plurality of vertices that is closest to the given pixel location. Under such a scheme of association, pixel locations in the vertex space that are within an enclosing space 535 could also be associated with the first vertex. The enclosing space 535 could be defined as the subset of space within the vertex space 500b within which the closest vertex 530 is the closest vertex of the plurality of vertices. Conversely, under such an association scheme the example vertex 550 could be associated with pixel locations 560 within a second example space 565. The second example space 565 could be defined as the subset of space within the vertex space 500b within which the example vertex 550 is the closest vertex of the plurality of vertices.

Note that the location of the plurality of vertices in the vertex space 500b, as illustrated in FIG. 5B, is meant as a non-limiting example of a pattern of location of vertices in a vertex space. As illustrated, the vertices are located in the vertex space 500b at the vertices of regular, regularly-tiled triangles (i.e., regular 2-dimensional simplexes). The vertices could instead be located in some other regular or irregular pattern in the vertex space 500b according to an application.

For example, the vertices could be located in the vertex space 500b at the vertices of regularly-tiled irregular triangles (e.g., isosceles triangles, scalene triangles). The angle of the major axis of the tiling of the triangles could be parallel to one of the axes of one or more of the dimensions of the vertex space 500b (e.g., parallel to the 'Pixel Location' Axis, as illustrated in FIG. 5B) or could have some other orientation. The vertices could have a first 'effective resolution' (i.e., a period of pattern repetition) in a first direction or directions in the vertex space 500b (e.g., a first period of repetition in spatial dimension of a vertex space) and a second 'effective resolution' in a second direction or directions (e.g., a second period of repetition in a color-space dimension of the vertex space). Other patterns, scales, and schemes of association with pixel locations of a plurality of vertices in a vertex space are anticipated.

Figure 6A:
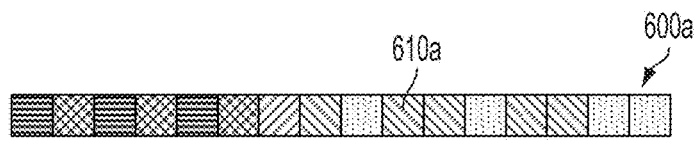
FIG. 6A depicts pixel locations of an example one-dimensional image.

To illustrate another pattern example of the association of pixel locations of an image with vertices in a vertex space, FIG. 6A depicts an example one-dimensional image 600a (i.e., a one-dimensional strip of pixel locations). Pixel locations of the image 600a (including given pixel location 610a) define respective brightnesses (i.e., individual pixel locations of the image 600a define colors within a one-dimensional (e.g., black-and-white) color-space).

Figure 6B:
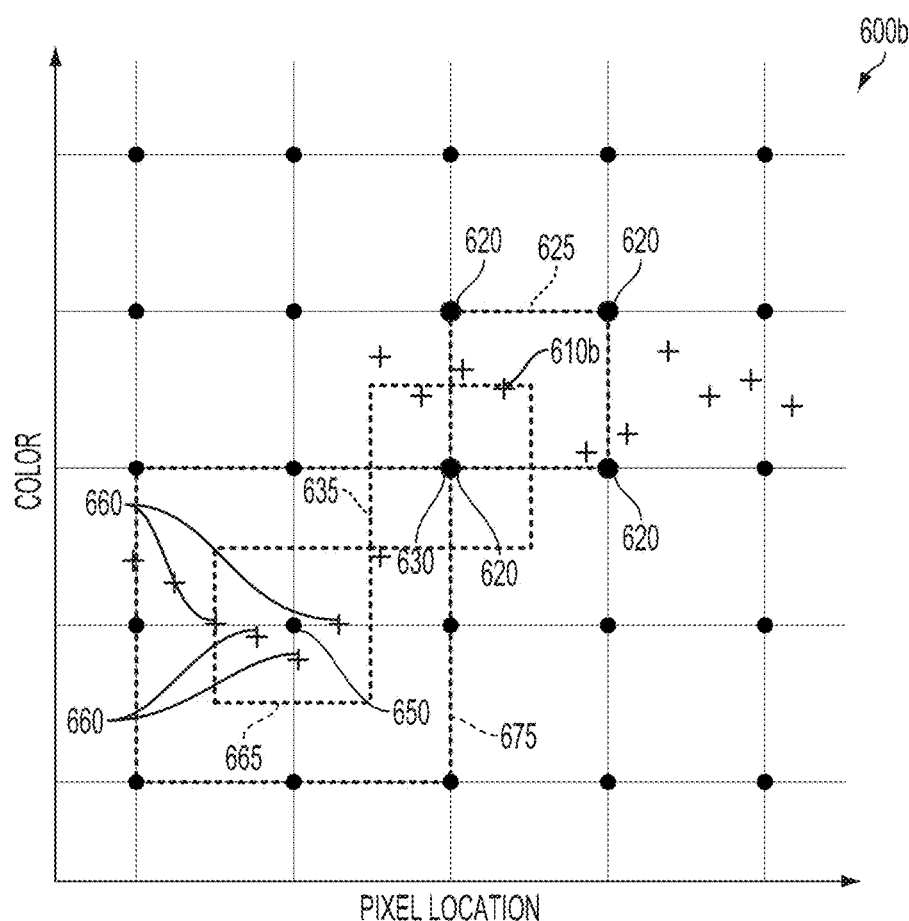
FIG. 6B depicts an example vertex space containing example vertices into which the pixel locations of FIG. 6A have been embedded.

FIG. 6B depicts an example two-dimensional vertex space 600b. The vertex space 600b includes a spatial dimension (labeled 'Pixel Location,' illustrated as the horizontal axis) corresponding to the location of the pixel locations of the image 600a within the one-dimensional 'frame' of the image 600a. The vertex space 600b additionally includes a color-space dimension (labeled 'Color,' illustrated as the vertical axis; brighter pixel locations are located in higher locations within the vertex space 600b). The locations of the pixel locations of the image 600a within the vertex space 600b are indicated by crosses. A plurality of vertices are located in the vertex space 600b. The locations of the vertices are regularly spaced in the vertex space 600b in a square pattern and indicated by dots. The vertices within the vertex space 600b could be described as being at the location of vertices of a regularly-stacked (or tessellated) pattern of regular squares (i.e., 2-dimensional hypercubes).

The pixel locations of the image 600a could be associated with vertices within the vertex space 600b according to proximity or some other property of the relative location of the pixel locations and vertices within the vertex space 600b. In a first scheme of association of pixel locations with vertices, a given pixel location 610b in the vertex space 600b (corresponding to the given pixel location 610a of the image 600a) could be associated with four vertices 620 that define an enclosing square 625 that encloses an area (or more generally, a space of dimension equal to the number of dimensions of the vertex space) of the vertex space that contains the given pixel location 610b. In such an example association, the given pixel location 610b could be equally associated with each of the four vertices 620 or could be associated in a weighted fashion according to some function or other consideration. For example, the given pixel location 610b could be associated with individual vertices of the four vertices 620 according to respective distances in the vertex space 600b between the given pixel location 610b and the individual vertices (e.g., according to some barycentric partition or other assignment of the given pixel location 610b between the vertices of the four vertices 620).

Similarly, other pixel locations within the enclosing square 625 could be associated with the four vertices 620 (though the weighting of the association between a first pixel location within 625 and the four vertices 620 could be different from the weighting of the association between a second pixel location within 625 and the four vertices 620 according, e.g., to a difference in the location within the vertex space 600b of the first and second pixel locations). Conversely, under such an association scheme an example vertex 650 could be associated with pixel locations within a first example space 675. The first example space 675 could be defined as the set of enclosing squares that include the first example vertex 650 as a vertex.

As an example of another scheme of association, the given pixel location 610b could be associated with a closest vertex 630 of the plurality of vertices that is closest to the given pixel location. Under such a scheme of association, pixel locations in the vertex space that are within an enclosing space 635 could also be associated with the first vertex. The enclosing space 635 could be defined as the subset of space within the vertex space 600b within which the closest vertex 630 is the closest vertex of the plurality of vertices. Conversely, under such an association scheme the example vertex 650 could be associated with pixel locations 660 within a second example space 665. The second example space 665 could be defined as the subset of space within the vertex space 600b within which the example vertex 650 is the closest vertex of the plurality of vertices.

Note that the location of the plurality of vertices in the vertex space 600b, as illustrated in FIG. 6B, is meant as a non-limiting example of a pattern of location of vertices in a vertex space. As illustrated, the vertices are located in the vertex space 600b at the vertices of regular, regularly-tiled rectangles (i.e., squares or regular 2-dimensional hypercubes). The vertices could instead be located in some other regular or irregular pattern in the vertex space 600b according to an application.

For example, the vertices could be located in the vertex space 600b at the vertices of regularly-tiled irregular hyper-rectangles. The angle of the major axis of the tiling of the squares, rectangles, hypercubes, hyper-rectangles, or other stacked, tiles, or otherwise tessellated shapes could be parallel to one of the axes of one or more of the dimensions of the vertex space 600b (e.g., parallel to both the 'Pixel Location' axis and the 'Color' axis, as illustrated in FIG. 6B) or could have some other orientation. The vertices could have a first 'effective resolution' (i.e., a period of pattern repetition) in a first direction or directions in the vertex space 600b (e.g., a first period of repetition in spatial dimension of a vertex space) and a second 'effective resolution' in a second direction or directions (e.g., a second period of repetition in a color-space dimension of the vertex space). Other patterns, scales, and schemes of association with pixel locations of a plurality of vertices in a vertex space are anticipated.

Note that the one-dimensional images 500a, 600a and corresponding two-dimensional vertex spaces 500b, 600b as illustrated in FIGS. 5A, 6A, 5B, and 6B, respectively, are intended as illustrative examples of a method for associating pixel locations of an image (e.g., a two-dimensional image comprising a two-dimensional array of pixel locations) with vertices in a vertex space (e.g., a vertex space having a number of spatial dimensions equal to a number of dimensions of a corresponding image and one or more color-space dimensions corresponding to color-space information of pixel locations of the image). In one example, pixel locations of a two-dimensional black-and-white (or greyscale) image could be associated with vertices in a three-dimensional vertex space having two spatial dimensions corresponding to the two dimensions (e.g., the horizontal and vertical directions) of the image and a third color-space dimension corresponding to the brightness or other greyscale information defined by the pixel locations of the image.

In another example, pixel locations of a two-dimensional color (e.g., RGB, YUV, $YP_BP_R$, $YC_BC_R$) image could be associated with vertices in a five-dimensional vertex space having two spatial dimensions corresponding to the two dimensions (e.g., the horizontal and vertical directions) of the image and three color-space dimensions corresponding to the color-space information (e.g., red-, green-, and blue-color intensities) defined by the pixel locations of the image. Additional or fewer spatial (e.g., corresponding to 1-dimensional line images or 3-dimensional volumetric or holographic images) and/or color-space (e.g., corresponding to hyperspectral color channels, corresponding to polarization information channels) dimensions of a vertex space are anticipated.

Further, note that the location of vertices within a vertex need not be regular, but could be specified according to any regular or irregular scheme according to an application. For example, the vertices could be located according to the centroids of a Gaussian or other KD-tree, a set of vertices resulting from greedy consolidation of an initial regularly-spaced set of vertices, or according to some other spacing within the vertex space and/or partitioning of the vertex space.

Figure 7A:
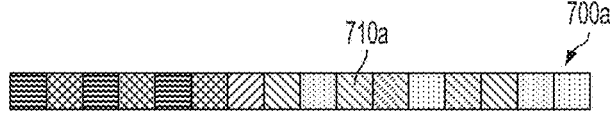
FIG. 7A depicts pixel locations of an example one-dimensional image.
Figure 7B:
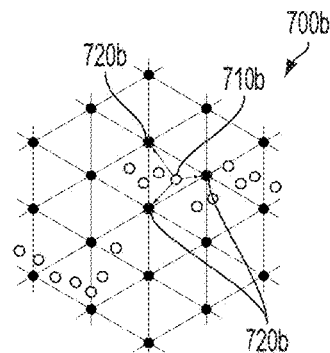
FIG. 7B depicts an example vertex space containing example vertices into which the pixel locations of FIG. 7A have been embedded.

FIGS. 7A to 7E illustrate the association of pixel locations of an image with vertices in a vertex space to allow for filtering of the pixel locations of the image. FIG. 7A depicts an example one-dimensional image 700a (i.e., a one-dimensional strip of pixel locations). Pixel locations of the image 700a (including given pixel location 710a) define respective brightnesses (i.e., individual pixel locations of the image 700a define colors within a one-dimensional (e.g., black-and-white) color-space). FIG. 7B depicts an example two-dimensional vertex space 700b. The vertex space 700b includes a spatial dimension (illustrated as the horizontal axis) corresponding to the location of the pixel locations of the image 700a within the one-dimensional 'frame' of the image 700a. The vertex space 700b additionally includes a color-space dimension (illustrated as the vertical axis). The locations of the pixel locations of the image 700a within the vertex space 700b are indicated by crosses. A plurality of vertices are located in the vertex space 700b. The locations of the vertices are regularly spaced in the vertex space 700b in a triangular pattern and indicated by dots.

Given pixel location 710b in the vertex space 700b (corresponding to the given pixel location 710a of the image 700a) could be associated with three vertices 720b that define an enclosing triangle that encloses an area of the vertex space 700b that contains the given pixel location 710b. In such an example association, the given pixel location 710b could be associated with the three vertices 720b in a weighted fashion according to some function or other consideration. As a result, individual vertices of the plurality of vertices in the vertex space 700b (including the three vertices 720b) are associated with zero or more pixel locations of the image 700a such that information about an individual vertex is related to corresponding information about the zero or more pixel locations associated with the individual vertex.

For example, a vertex brightness of an individual vertex could be a weighted average of the individual brightnesses of pixel locations associated with the individual vertex. Information about vertices that are not associated with any pixel locations (i.e., that are associated with zero pixel locations) could be set to zero or not calculated, considered, or otherwise used in subsequent calculations, or handled in some other way according to an application.

Figure 7C:
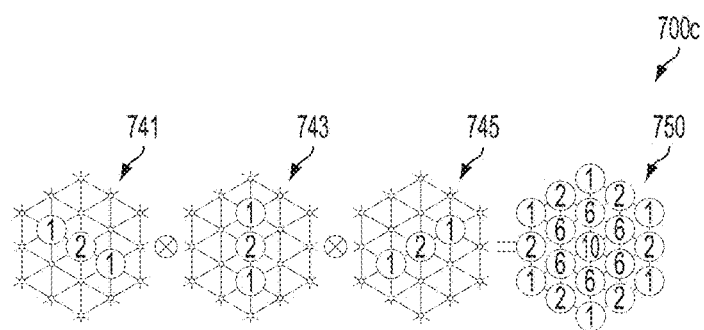
FIG. 7C graphically depicts a filtering process performed on the vertices illustrated in FIG. 7B.

The vertex information could then be filtered. FIG. 7C illustrates the filtering 700c of the vertex information of the vertices illustrated in FIG. 7B by a full blurring kernel 750. The application of the full blurring kernel 750 could be mathematically equivalent or nearly equivalent in some way to the sequential application of three sparse blurring kernels 741, 743, 745. Thus, sequential application of the three sparse blurring kernels 741, 743, 745 could allow for faster filtering 700c of the vertex information by a computing system (e.g., by a DSP, GPU, or other specialized processor) than direct application of the full blurring kernel 750.

Figure 7D:
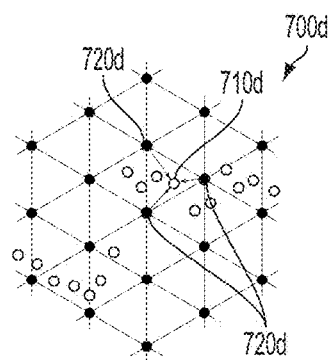
FIG. 7D depicts an example vertex space containing filtered output vertices of the filtering process illustrated in FIG. 7C and related embedded pixel locations.
Figure 7E:
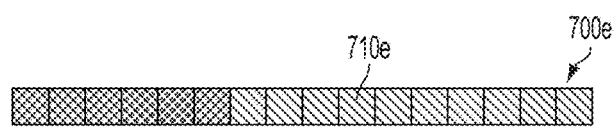
FIG. 7E depicts pixel locations of a filtered one-dimensional image generated based on the filtered output vertices of FIG. 7D.

FIG. 7D depicts a two-dimensional output vertex space 700d. The output vertex space is configured similarly to the vertex space 700b. The location of the pixel locations of an output image 700e (illustrated in FIG. 7E) within the output vertex space 700d are indicated by crosses. The locations of output vertices within the output vertex space 700d are indicated by dots and are located in substantially the same locations in the vertex space 700d as the location of the vertices in the vertex space 700b. Further, associations between pixel locations of the output image 700e and output vertices in the output vertex space 700d are substantially the same as between pixel locations of the input image 700a and vertices in the vertex space 700b. The brightness of a given output pixel location 710d in the output vertex space (corresponding to the determined brightness of given output pixel location 710e of the output image 700e) could be determined as a weighted combination of determined brightnesses of three output vertices 720d associated with the given output pixel location 710d.

Generally, pixel locations of an image can be associated with a small set of one or more vertices of a plurality of vertices in a vertex space. Such an association could be according to a variety of schemes (e.g., nearest vertex, nearest n vertices, vertices defining an enclosing space, a weighted association with a determined set of vertices) according to a variety of metrics (e.g., a distance within a vertex space wherein the dimensions of the vertex space are scaled according to some application, e.g., a first scaling of spatial dimensions of the vertex space and a second scaling of color-space dimensions of the vertex space). Such associations could be as described herein, or otherwise.

Generally, pixel locations of an image and/or information thereof (e.g., brightnesses, determined disparity values) could be based on a weighted combination of corresponding associated vertices and/or information thereof (e.g., vertex brightnesses, determined vertex disparity values). Specifically, for the case wherein pixel location disparity values are determined based on determined vertex disparity values, pixel location disparity values could be related to determined vertex disparity values by:

$$d=S^T v$$

wherein d is a vector of determined pixel location disparity values, v is a vector of determined vertex disparity values, and $S^T$ is a matrix whose elements describe the weighted association between individual vertices and individual pixel locations.

Thus, a particular row of $S^T$ corresponding to a respective particular pixel location is zero for all columns corresponding to vertices that are not associated with the particular pixel location, and a nonzero value related to the weight of a corresponding vertex in determining the disparity value of the particular pixel location relative to the determined vertex disparity value of other vertices (i.e., nonzero values in other corresponding columns). Alternatively, $S^T$ could be a full matrix (i.e., could have substantially no nonzero entries) if individual pixel locations of an image are, to some nonzero degree, related to all of the vertices in a vertex space.

Relative to the example associations between pixel locations and vertices as described elsewhere herein (e.g., in FIGS. 5A, 5B, 6A, and 6B), nonzero elements of a particular row of $S^T$ could correspond to vertices associated with the pixel location corresponding to the particular row, and the relative value of the nonzero elements could correspond to the relative weighting of the relationship of the particular pixel location with the associated vertices (e.g., according to a relative distance between the particular pixel location and the vertices, e.g., according to some barycentric weighting).

Determination of a plurality of disparity values for respective pixel locations of a first image based on information in the first image and a second image could include determining respective disparity loss functions (as described elsewhere herein, or according to some other method and/or application) of the pixel locations. The determined disparity loss functions for a given pixel location of the first image could indicate variation in color-space similarity (e.g., a similarity of brightness, a similarity of color, a similarity of a red-, green-, or blue-color intensity) between the given pixel location of the first image and a corresponding range of pixel locations of the second image spanning a range of distances (e.g., spanning a range of disparities) from the given pixel location in the first image within the frame of the second image. The determined disparity loss functions could include polynomial functions, parabolic functions, piecewise-defined functions, piecewise linear functions, hinge functions, or some other functions or combinations of functions.

Individual pixel locations of a first image could be associated with one or more vertices in a vertex space according to one or more schemes or methods described herein and/or according to some other method and/or application. For example, an individual pixel location could be associated with a nearest vertex, a set of nearest vertices, a set of vertices defining an enclosing shape, or according to some other partition criterion. Further, configuration of the vertex space (e.g., a number of spatial and/or color-space dimensions, and correspondence thereof with spatial, color-space, or other properties of pixel locations of the first image) and the arrangement of the vertices within the vertex space (e.g., at the vertices of a regular tessellation or other tiling of the vertex space by a plurality of regular or irregular multidimensional shapes (e.g., squares, rectangles, cubes, hypercubes, hyper-rectangles, triangles, tetrahedral, simplexes)) could be specified according to a variety of methods and/or applications.

For each vertex in a vertex space, a vertex-disparity loss function could be determined based on a combination of zero or more disparity loss functions corresponding to respective zero or more pixel locations associated with the vertex. The determined vertex-disparity loss function could be a sum, an average, a weighted average, or some other function or combination of the zero or more disparity loss functions of the associated respective pixel locations. For example, the vertex-disparity loss function for vertices in a vertex space could be mathematically defined as:

$$g_j(d) = \sum_{(w,i) \in S_j} w f_i(d)$$

wherein $g_j(d)$ is the vertex-disparity loss function for the $j^{th}$ vertex of a set of vertices in a vertex space, $f_i(d)$ is the disparity loss function of the $i^{th}$ pixel location of a set of pixel locations of a first image, d is a given input disparity to the vertex/pixel location disparity loss functions, $S_j$ is a row of an association matrix describing the association between the $j^{th}$ vertex and pixel locations of the first image. i represents the indices of $S_j$ that are nonzero, and w represents the values of those nonzero elements of $S_j$.

Note that, while the above equation implies that output values of $f_i$ be calculated for a range of individual values of d and the resulting outputs be individually used to determine corresponding output values of $g_j$ for respective individual values of d, output values of $g_j$ for respective individual values of d could be determined implicitly, based on the structure of the function(s) used to determine the $f_i$. For example, the $f_i$ could be hinge loss functions (e.g., functions similar to 430 as illustrated in FIG. 4B and parameterized individually by respective upper and a lower hinge disparity values) and the $g_j$ could be efficiently determined based on the upper and lower hinge disparity values of hinge loss functions corresponding to pixel locations associated with individual vertices.

Such determined vertex-disparity loss functions could be applied in a variety of ways to determine respective vertex disparity values for each of the plurality of vertices in the vertex space. In some examples, the disparity values of individual vertices could be determined by performing an optimization using the determined vertex-disparity loss functions, e.g., by performing a gradient descent using a cost function that is based on the vertex-disparity loss functions (e.g., that comprises a weighted sum of the determined vertex-disparity loss functions of the vertices in the vertex space). In some examples, the vertex disparity values of individual vertices in the vertex space could be determined independently of the determination of disparity values for other vertices in the vertex space.

Alternatively, the vertex disparity values of individual vertices in the vertex space could be determined in consideration of determined vertex disparity values of other vertices in the vertex space. For example, a cost function that includes a vertex loss term related to the determined vertex-disparity loss functions of the vertices and that includes a vertex smoothness term related to the similarity between individual determined vertex disparity values (e.g., determined vertex disparity values of neighboring vertices within the vertex space) could be minimized (e.g., by gradient descent, dynamic programming, or some other method) to determine vertex disparity values for vertices in the vertex space.

An example cost function that includes a smoothness term (to the left of the addition symbol) and a loss term (to the right of the addition symbol) is described by the following equation:

$$v^T(C_i - C_d \overline{B} C_d) v + \lambda \sum_j g_j(v_j)$$

wherein $f_j(v_j)$ is the vertex-disparity loss function for the $j^{th}$ vertex of the plurality of vertices in the vertex space, given an input vertex disparity of $v_j$ (i.e., the $j^{th}$ element of v). $(C_i - C_d \overline{B} C_d)$ is an affinity matrix whose elements (e.g., whose $[i,j]^{th}$ element) are related to a specified smoothness cost for similarity between determined vertex disparity values pairs of vertices in the plurality of vertices (e.g., for the $i^{th}$ and $j^{th}$ vertices of the plurality of vertices in the vertex space). That is, a higher value for a given element of $(C_i - C_d \overline{B} C_d)$ will result in a higher cost for a given difference between determined vertex disparities for corresponding first and second vertices of the plurality of vertices. $\lambda$ is a weighting factor that can be specified to set a relative importance of the smoothness term and the loss term in determining the overall cost of a given set of determined vertex disparity values v (wherein the $i^{th}$ element of v is $v_j$, the determined vertex disparity value for the $j^{th}$ vertex of the plurality of vertices).

The elements of $(C_i - C_d \overline{B} C_d)$ could be chosen such that the smoothness cost for similarity between determined vertex disparity values are related to a specified smoothness cost between determined disparity values of corresponding pixel locations of a first image. For example, the smoothness cost for similarity between determined vertex disparity values could be related to an exponential or other function of the distance, within the frame of the first image, between the $i^{th}$ and $j^{th}$ pixel locations of the first image, as described above. For example, a matrix of chosen pixel-location-related affinity factors could be determined (e.g., according to a set of pixel-pairwise Gaussian potentials defined based on the distance between pairs of pixel locations in an XYRGB or other space as described above) and parameterized according to the association between the pixel locations of the first image and vertices of the plurality of vertices in the vertex space, e.g., by $A = S^T \overline{B} S$, where matrix S describes the association and weighting relationship between pixel locations of the first image and vertices of the plurality of vertices in the vertex space (as described elsewhere herein).

A could be modified into a symmetric and bistochastic matrix $\hat{A}$ by pre- and post-multiplication by, e.g., a diagonal matrix D. That is, $\hat{A}$ and A could be related by the equation:

$$\hat{A} = DAD$$

wherein the diagonal matrix D could be determined by a variety of methods (e.g., the Sinkhorn method, or by some other method or methods). The determined diagonal matrix D, in combination with the matrix S, could be used to determine the individual terms of $(C_i - C_d \overline{B} C_d)$; specifically:

$$C_d = SDS^T$$

and:

$$C_i = SS^T$$

Alternate smoothness terms could be used to determine vertex disparity values for the plurality of vertices in the vertex space. The alternate smoothness terms could be related to the location of the vertices in the vertex space, a number of pixel locations associated with individual vertices in the vertex space (e.g., to a 'mass' of the vertices that is related to the number of pixel locations that an individual vertex is associated with), an aggregation, distance to other pixel locations, or other properties of the location within the vertex space of pixel locations associated with individual vertices, or some other factor or combination of factors.

The number of vertices in the plurality of vertices in the vertex space could be based on one or more properties of an image (e.g., a first image of a stereo image pair). Further, the location of the plurality of vertices within the vertex space could be specified and/or determined based on the image. The locations of the vertices in the vertex space could span a volume in the vertex space that is spanned by the pixel locations of a first (i.e., reference) image. For example, the vertex space could be three-dimensional (e.g., the first image could be black-and-white) and the vertices could span a volume in the two spatial dimensions of the vertex space corresponding to the extent of the frame of the first image and in the one-dimensional color-space dimension corresponding to the range of brightness values represented by the pixel locations of the first image. For example, the locations of the vertices in the vertex space could span a volume in the vertex space that is spanned by the pixel locations of the image (e.g., three-dimensional vertex space could include vertices that span a volume in two spatial dimensions of the vertex space corresponding to the extent of the frame of the image and in a one-dimensional color-space dimension corresponding to the range of brightness values represented by the pixel locations of the image).

The number of vertices in the plurality of vertices could be determined independently of an image or images for which disparity information is determined as described herein. For example, a number of vertices could be specified for the performance of the methods described herein for images and/or image pairs having a range of resolutions and/or numbers of pixel locations. The specified number of vertices could be small (e.g., less than 1%) of the number of pixel locations of images used to perform the methods described herein.

Generally, the time required to perform the methods described herein to determine disparity information for pixel locations of an image (e.g., for a first image of a stereo image pair) could be related to a vertex-disparity-value-determination step that is slow (relative, e.g., to steps to determine disparity loss functions for pixel locations of the image, to associate individual pixel locations with one or more vertices, and/or to determine pixel location disparity values based on determined vertex disparity values) and that has a time to perform that is further related to the specified number of vertices. Thus, given a specified number of vertices, it could take approximately the same amount of time to perform the pixel-location-disparity-determination methods described herein for a first image having a first resolution (e.g., a first number of pixels) as to perform the methods described herein for a second image having a second resolution (e.g., a second number of pixels) that is substantially larger than the first resolution.

The methods described herein could be performed only for vertices of a plurality of vertices in a vertex space that are associated with at least one pixel location of an image (e.g., of a first image of a stereo image pair). That is, a set of vertices within a plurality of vertices could be associated with no pixel locations of the image, and thus methods and/or steps described herein (e.g., the determination of a vertex-disparity loss function, the determination of a vertex disparity value) could be performed only for vertices that are not members of that set (i.e., the methods and/or steps could be performed only for vertices that are associated with one or more pixel locations of the image). This distinction could include using sparse methods for matrix multiplication or for other matrix and/or vector operations, or could include the use of additional or alternate methods according to an application.

V. Example Methods

Figure 8:
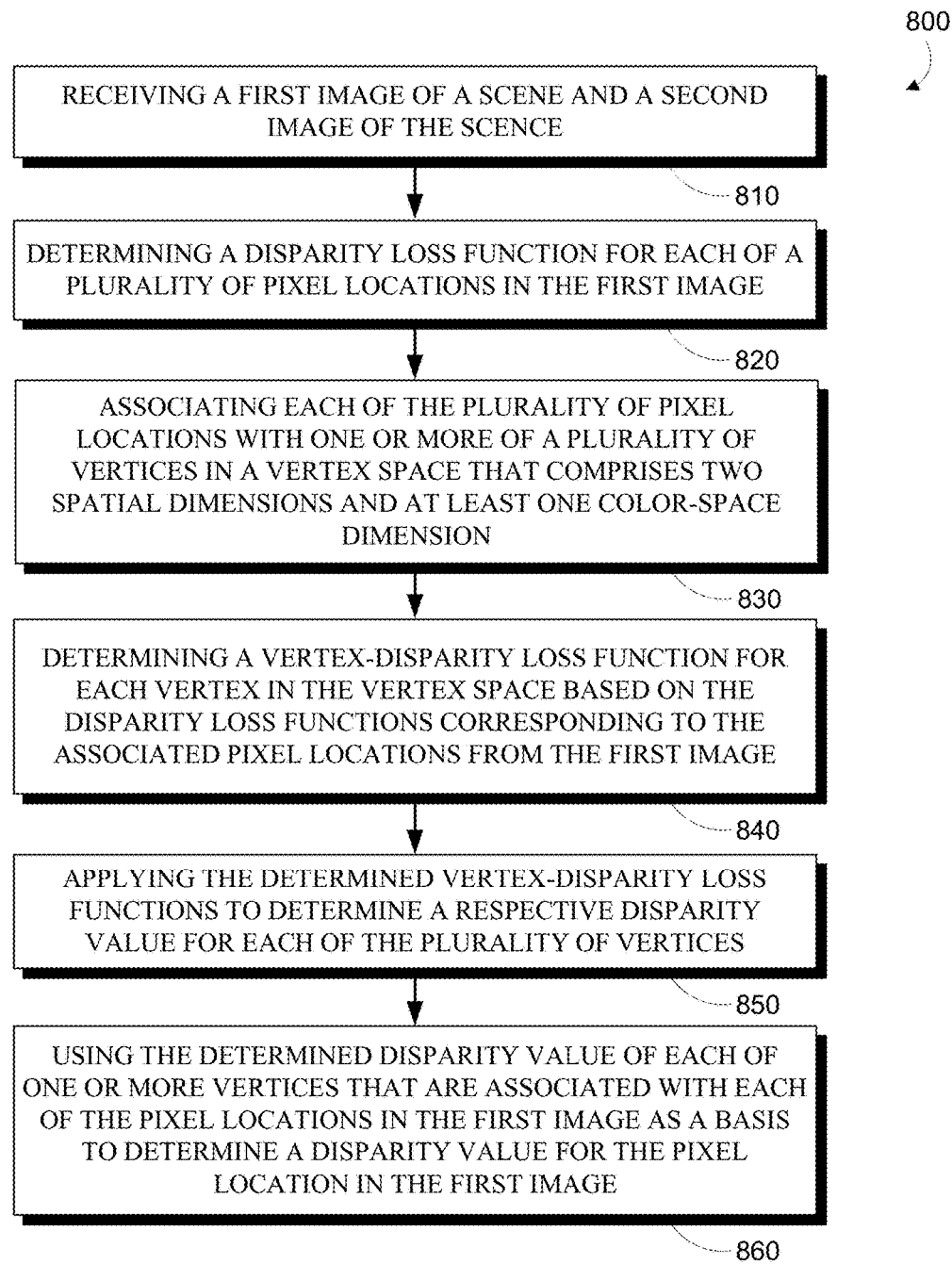
FIG. 8 illustrates an example method.

FIG. 8 is a flowchart illustrating a method 800, according to an example embodiment. Method 800 may be implemented by a device that includes two or more cameras oriented in the same direction, where each camera is separated from the other cameras by some distance, such as the devices shown in FIGS. 1A and 1B and FIGS. 9A to 9E or some other device (including by not limited to camera devices, mobile devices, portable devices, cellphones, laptops, tablet computers, biometric identification systems, human interface devices, robots, drones, self-driving cars, and autonomous vehicles).

Alternatively, method 800 may be implemented by a device or system that is separate from and configured to communicate with such a multi-camera device and/or to access images (e.g., stereo image pairs) that are stored in a memory (e.g., a memory card, a compact disc, a hard drive, a cloud storage service, a memory of a remote server (e.g., a server in communication with the internet)). In any case, method 800 may be implemented to determine disparity information for pixel locations of a first image based on information in the first image and in a second image.

The method 800 includes receiving a first image of a scene and a second image of the scene (810). This can include operating first and second cameras to capture respective first and second images of the scene. Additionally or alternatively, the first and second images could be captured by a single camera at two different points in time, where the location of the camera is moved from a first perspective to a second perspective between the first and second periods of time. Receiving first and second images of a scene (810) can include accessing first and second images from a memory, e.g., from a memory card, a hard drive, a compact disk, or from a remote system (e.g., from a remote server that is accessible over the internet).

Further, receiving first and second images of a scene (810) can include accessing and/or generating images that are not captured images of a real-world scene. For example, it could include accessing first and second images that were generated by a simulation, computer graphics, or other computational process. Other methods or combinations of methods for generating, capturing, filtering, modifying, or otherwise receiving first and second images of a scene (810) are anticipated.

The method 800 additionally includes determining a disparity loss function for each of a plurality of pixel locations in the first image 820. A determined disparity loss function for a given pixel location of the first image could take as an input a disparity value and could be related to a degree of similarity between the given pixel location (e.g. a similarity of color, brightness, or some other pixel and/or pixel location property) and a pixel location of a second image that is displaced from the first pixel location, within the second image, by a distance equal to the input disparity value.

The disparity loss function for a given pixel location could be defined for a range of pixels locations in the second image; for example, the disparity loss function for a given pixel location could be defined for a range of distances between zero (i.e., comparison between the given pixel location and a pixel location of the second image having the same location as the given pixel location, within the frame of the second image) and some defined upper bound (e.g., a distance between the given pixel location and the edge of the second image, such that the disparity loss function describes the similarity between the given pixel location and a set of pixels locations of the second image at or to one direction (e.g., the right) of the given pixel location, in the second image)). In some examples, the determined disparity loss functions for each pixel location in the first image could include hinge loss functions. Determining a disparity loss function for each pixel location in the first image 830 could include additional or alternate processes, functions, functionals, determinations, or other aspects as described herein.

The method 800 additionally includes associating each of the plurality of pixel locations with one or more of a plurality of vertices in a vertex space that comprises two spatial dimensions and at least one color-space dimension 830. Associating each pixel location with one or more vertices 830 could be based on a proximity or some other relationship within the vertex space between the pixel locations and the vertices (e.g., a given pixel location could be associated with the nearest vertex within the vertex space, or with a set of vertices (e.g., a set of vertices defining the vertices of a shape in the vertex space that encloses the given pixel location)). The vertex space could have spatial dimensions (e.g., dimensions corresponding to horizontal and vertical dimensions of pixel locations within the first image) and one or more color-space dimensions (e.g., dimensions corresponding to the brightness, color, red, green, or blue intensity, or other properties of the pixel locations within a color-space).

In some examples, the first image could be a color image (e.g., could be an image whose pixels and/or pixel locations define colors in a color-space, e.g., a red-green-blue (RGB) color space)) and the vertex space could have two spatial dimensions corresponding to the pixel locations within the frame of the image(s) and a further three color-space dimensions corresponding to the location, in the color-space, of colors defined by the plurality of pixel locations of the first image. Higher- or lower-dimensional vertex spaces could be used for images whose pixels and/or pixel locations define more or less color information (e.g., whose pixels define colors in a two-dimensional color-space (e.g., a red-green color-space) or a more than three-dimensional color-space (e.g., a color-space defined to represent the output of detectors of a hyperspectral imager)) or other information (e.g., the direction and/or degree of polarization of light in the image).

The locations of the vertices in the vertex space could span a volume in the vertex space that is spanned by the pixel locations of the first image. For example, the vertex space could be three-dimensional (e.g., the first image could be black-and-white) and the vertices could span a volume in the two spatial dimensions of the vertex space corresponding to the extent of the frame of the first image and in the one-dimensional color-space dimension corresponding to the range of brightness values represented by the pixels and/or pixel locations of the first image.

Further, the locations of the vertices in the vertex space could be regularly spaced (e.g., to provide a uniform 'sampling' of the volume of the vertex space corresponding to the first image). For example, the vertices could be located in the vertex space at the vertices of a tessellated and/or regularly repeating array of three- or more-dimensional shapes or according to some other regular pattern. In some examples, the vertices could be located in a rectangular array (i.e., regularly spaced along orthogonal directions in the multi-dimensional space, at the vertices of a tessellated array of hyper-rectangles). In some examples, the vertices could be located in a triangular array (i.e., at the vertices of triangles, tetrahedra, or higher-dimensional simplexes that are regularly tessellated in the vertex space).

The method 800 additionally includes determining a vertex-disparity loss function for each vertex in the vertex space based on the disparity loss functions corresponding to the associated pixel locations from the first image 840. For a given vertex in the vertex space, a vertex-disparity loss function could be determined based on a combination of zero or more disparity loss functions corresponding to respective zero or more pixel locations associated with the vertex. The determined vertex-disparity loss function could be a sum, an average, a weighted average, or some other function or combination of the zero or more disparity loss functions of the associated respective pixel locations. Further, vertex-disparity loss functions for vertices that are not associated with any pixel locations (i.e., that are associated with zero pixel locations) could be set to zero or not calculated, not considered, or otherwise not used in subsequent calculations, or handled in some other way according to an application.

The method 800 additionally includes applying the determined vertex-disparity loss functions to determine a respective disparity value for each of the plurality of vertices 850. In some examples, applying the determined vertex-disparity loss functions to determine respective disparity values 850 could include performing an optimization using the determined vertex-disparity loss functions, e.g., by performing a gradient descent using a cost function that is based on the vertex-disparity loss functions (e.g., that comprises a weighted sum of the determined vertex-disparity loss functions of the vertices in the vertex space). In some examples, the vertex disparity values of individual vertices in the vertex space could be determined independently of the determination of disparity values for other vertices in the vertex space.

Alternatively, the vertex disparity values of individual vertices in the vertex space could be determined in consideration of determined vertex disparity values of other vertices in the vertex space. For example, a cost function that includes a loss term related to the determined vertex-disparity loss functions of the vertices and that includes a smoothness term related to the similarity between individual determined vertex disparity values (e.g., determined vertex disparity values of neighboring vertices within the vertex space) could be minimized (e.g., by gradient descent, dynamic programming, or some other method) to determine vertex disparity values for vertices in the vertex space.

The method 800 additionally includes using the determined disparity value of each of one or more vertices that are associated with each of the pixel locations in the first image as a basis to determine a disparity value for the pixel location in the first image 860. For example, a disparity value for a given pixel location in the first image could be determined based on a weighted combination of determined vertex disparity values of one or more vertices that are associated with the given pixel location.

The method 800 could include additional steps or elements in addition to those listed above (e.g., 810, 820, 830, 840, 850, 860). For example, the method 800 could include determining depth information (e.g., pixel locations depth values for each pixel location in the first image) from the determined disparity values for the pixel locations in the first image. As such, the disparity information may be utilized to generate a depth map of the scene. The depth map may then be used help determine focus settings for the scene, to determine the location of objects in the scene, to map the scene, to navigate the scene (e.g., to operate a robot or other autonomous device to move through the scene) and/or may be used for other purposes. The method 800 could include performing image processing on the first image based on determined disparity values for pixel locations of the first image. For example, an image processing process (e.g., a blur, a filtering, an increase or decrease in contrast, a change in a color balance, an application of a color filter) could be performed selectively on regions of the first image corresponding to objects (i.e., regions of pixel locations within the first image) that have determined disparity values within a specified range of values.

The method 800 could include other applications or processes based on determined pixel location disparity information. Applications of information (e.g., determined pixel location and/or vertex disparity values) determined using the method 800 include but are not limited to augmented reality (e.g., providing depth cues, assisting in navigation), human interfaces (e.g., determining the location of parts of a user's body and using the determined locations to control the operation of a computer or other system), logistics (e.g., determining the location and size of boxes, packages, or other objects in a transport vehicle, container, loading zone, warehouse or other environment), biometrics (e.g., determining a depth-based mapping of a person's face or other body part and comparing the determined mapping to a database of stored mappings corresponding to identified users), and determining the location of a device (e.g., matching an image-determined mapping to a region of a known environment). Other additional and/or alternative elements and/or applications of method 800 are anticipated In some examples, the scene described in relation to the method 800 above could include an outdoor environment (e.g., a path, a roadway, an airspace, a waterway, a field) and a plurality of objects (e.g., rocks, traffic control systems, human beings, animals, plants, obstacles, autonomous vehicles). In some examples, the scene could include a human being, and determined disparity, depth, or other information determined from at least two images (e.g., for first and second images of a stereo image pair) of the scene could be used to receive input from the human being (e.g., to provide a human-computer interface), to determine and/or confirm the identity of the human being (e.g., to provide a biometric functionality), or to allow for some other application(s). Other scenes, environments, scene contents, and applications of determined disparity or other information determined from two or more images of such scenes are anticipated.

VI. Illustrative Systems

The physical components of an image capture device or other embodiments that might utilize image data (e.g., biometric systems, robotics, self-driving vehicles, or some other system used to navigate an open environment) may include an aperture through which light enters and a recording surface for capturing the image represented by the light. Such an image capture device could also include a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD), an array of active pixel sensors (APS), an array of complementary metal-oxide-semiconductor (CMOS) sensors, or some other array or other arrangement of electronic photodetectors) to capture and/or store captured images in a data storage unit (e.g., memory).

A shutter may be coupled to or nearby the aperture, lens, or recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its light-sensitive elements. While the electronic shutter remains "open," the light-sensitive elements may accumulate charge. When or after the shutter "closes," these charges may be transferred to longer-term data storage. An electronic shuttering process could include operating one or more active pixel sensors or other photodetectors to measure a property of image light received by the photodetectors during a specified period of time (i.e., the specified period of time comprises the "opening" of the electronic shutter). Combinations of mechanical and electronic shuttering may also be possible.

Regardless of type, a shutter may be activated and/or controlled by something other than a shutter button. For instance, the shutter may be activated by a softkey, a timer, or some other trigger. In some examples, a shutter could be operated a plurality of times at a specified rate (e.g., a frame rate) in order to capture a series of images that could comprise a video recording. Herein, the term "image capture" may refer to any mechanical and/or electronic shuttering process that results in one or more images being captured, regardless of how the shuttering process is triggered or controlled.

In examples including a lens, the lens could be mechanically or otherwise actuated to enable control of a focus (e.g., an effective focal length) of a camera. Such control of the focus could be manual (e.g., by manipulation by a user of mechanisms configured to actuate the lens). Alternatively, an electronic or other system could be configured to control the focus of the camera automatically. Generally, such an autofocus (AF) system may include a sensor of some kind, a control system that automatically determines focus settings, and an actuator to adjust the mechanical components of the camera (e.g., the lens) according to the focus settings. The data provided by the sensor may be used to evaluate the manner in which the environment is or will be recorded by an image sensor, and to responsively control an electromechanical system that can change the focus of the camera (e.g., by using an actuator to move components of the lens and/or changing the size of the aperture). Various types of autofocus techniques may be utilized by an image capture device (e.g., by digital camera devices 900, 920, 940, 960, 980).

Many consumer cameras include passive autofocus systems, which focus the lens on a subject by analyzing the image that is entering the optical system (e.g., they do not direct controlled beams of light on the subject in order to focus). Typical passive autofocus techniques include "phase detection" autofocus (PD-AF) and "contrast detection" autofocus (CD-AF), which may also be referred to as "contrast measurement" autofocus.

Passive autofocus processes typically involve a computing system (e.g., a processor) operating a mechanical lens system to adjust the focus settings of the lens (e.g., to change the focusing distance or depth of field), and then analyzing whether or not the resulting image (or subsection of such an image) is in focus. If the resulting image is not satisfactorily in focus, then the computing system again adjusts the focus settings and evaluates the focusing characteristics in the resulting image. In some implementations, each adjustment to the focus settings may be determined based on some measure of how out of focus the image is (or how out of focus a particular portion of the image is). In other implementations, the adjustments may be predetermined. In either case, this process may be repeated until the resulting image is deemed to be satisfactorily in focus.

When size and/or cost of components are significant in the design of a device, the device may utilize a camera system that does not include a separate autofocus system. Such is the case with many mobile phones, tablet computers, and/or other mobile devices, which often include camera systems that use the same image sensor for both autofocus and image capture. In many cases, cameras in portable devices such as mobile phones, tablet computers, and other mobile devices use CD-AF for purposes of focusing.

While CD-AF systems can use a separate sensor that is dedicated to autofocus, most CD-AF systems use the same image sensor for both image capture and autofocus sensing. CD-AF systems determine whether or not a subject is in focus by measuring the contrast in the image (of a subsection of such an image) that is detected on the sensor. To do so, a CD-AF system may evaluate the change in contrast at various points in the image, with higher contrast being interpreted as an indication of a sharper image.

More specifically, the difference in intensity between adjacent pixels of a sensor is generally greater when the subject captured in the adjacent pixels is in focus, as compared to when image subject is out of focus. Further, a CD-AF system may measure the contrast at specific pixels, or determine the average over certain groups of pixels. In either case, a CD-AF system may then adjust focus settings until a threshold contrast is detected (and possibly until a maximum contrast is detected). For example, an illustrative CD-AF system may pass image data through a high pass filter, and adjusts the focus of the lens until the output from the filter exceeds a threshold (and possibly until the output of the filter is at its highest level).

A. Devices with Multiple Image-Capture Systems

Figure 9A:
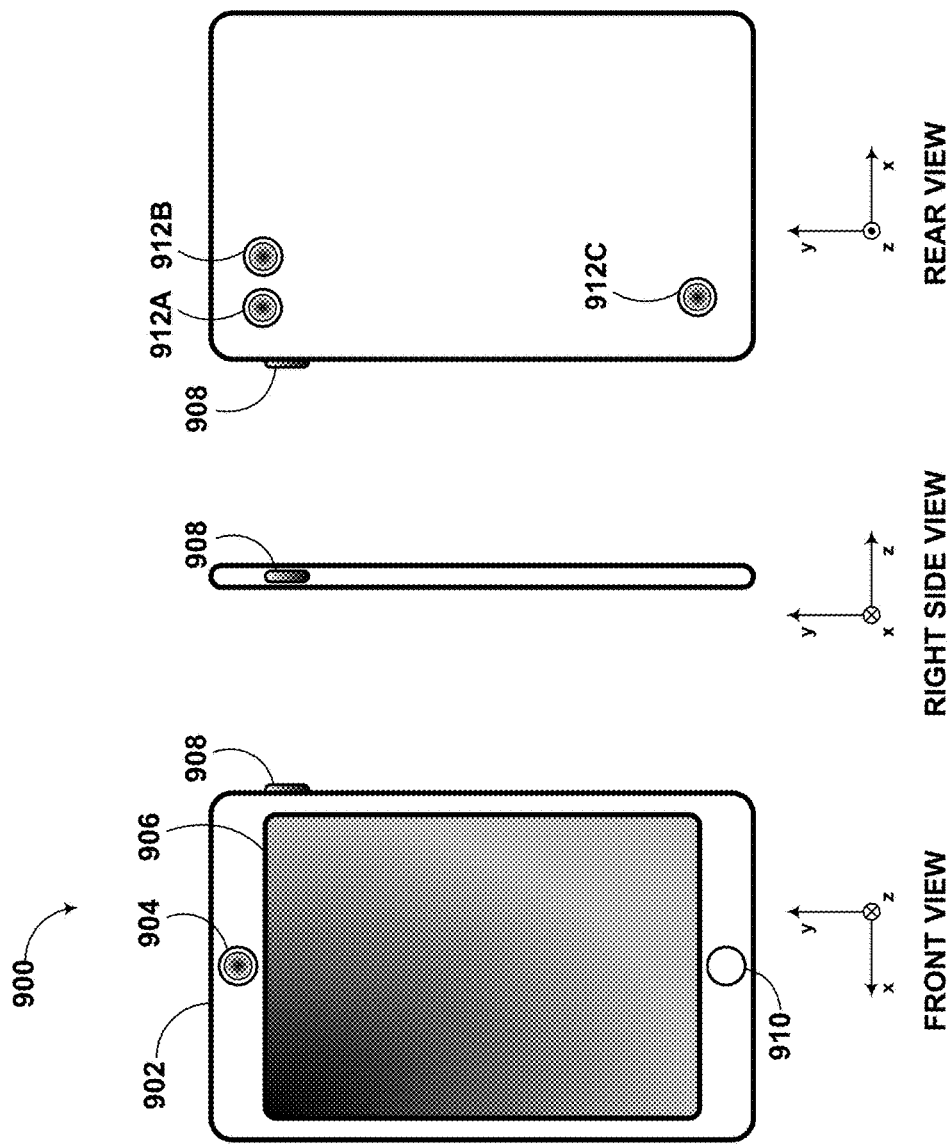
FIG. 9A depicts front, right side, and rear views of a digital camera device, in accordance with an example embodiment.

As noted previously, digital cameras may be standalone devices or integrated with other devices or systems (e.g., laptops, wearable computers, robots, drones). As an example, FIG. 9A illustrates the form factor of a mobile device 900. Mobile device 900 may be, for example, a mobile phone, a tablet computer, a wearable computing device, or some other portable and/or battery-powered device. However, other embodiments are possible. Mobile device 900 may include various elements, such as a body 902, a front-facing camera 904, a multi-element display 906, a shutter button 908, and other buttons 910. Digital camera device 900 could further include three rear-facing cameras 912A to 912C. Front-facing camera 904 may be positioned on a side of body 902 typically facing a user while in operation, or on the same side as the multi-element display 906. Rear-facing cameras 912A to 912C may be positioned on a side of body 902 opposite front-facing camera 904. Referring to the cameras as front and rear facing is arbitrary, and digital camera device 900 may include multiple cameras positioned on various sides of body 902.

The lenses of rear-facing cameras 912A and 912B are arranged on the upper corner on the back of digital camera device 900, while the lens of camera 912C is arranged on the lower corner on the back of device 900, opposite of camera 912A. Further, the lenses of rear-facing cameras 912 to 912C are oriented in substantially the same direction. (Note that herein, references to a cameras being oriented in the same direction should be understood to mean that the lenses of the cameras point in substantially the same direction.)

It should be understood that other multi-camera arrangements are possible. In particular, the lenses of three or more cameras, which are all oriented in substantially the same direction, may be arranged in different formations on a surface of the phone. For instance, several other multi-camera arrangements are described herein with respect to FIGS. 9B to 9E.

In particular, FIG. 9B shows a mobile device 920 with an arrangement of four cameras 922A to 922D oriented in the same direction, including two cameras 922A and 922B in the upper corner of the mobile device (similar to FIG. 9A), and two additional cameras 922C and 922D that are located at the lower corners of the mobile device 920. Further, FIG. 9C shows another arrangement with four cameras oriented in the same direction. In particular, the arrangement in FIG. 9C includes one camera 944A to 944D in each corner of the device 940.

Yet further, FIG. 9D shows an arrangement with six cameras 966A to 966F facing in the same direction. In FIG. 9D, the six cameras 966A to 966F are placed on the back of the mobile device 960 in less-structured, "organic," arrangement. Note that an arrangement with three or more cameras may provide multiple baselines between different pairs of cameras. For instance, a six-camera arrangement such as that shown in FIG. 9D may provide up to 15 different baselines (illustrated in FIG. 9D as dashed lines) for, e.g., stereoscopic imaging. More generally, an arrangement of n cameras that are oriented in substantially the same direction may provide up to C(n, k) baselines.

Figure 9E:
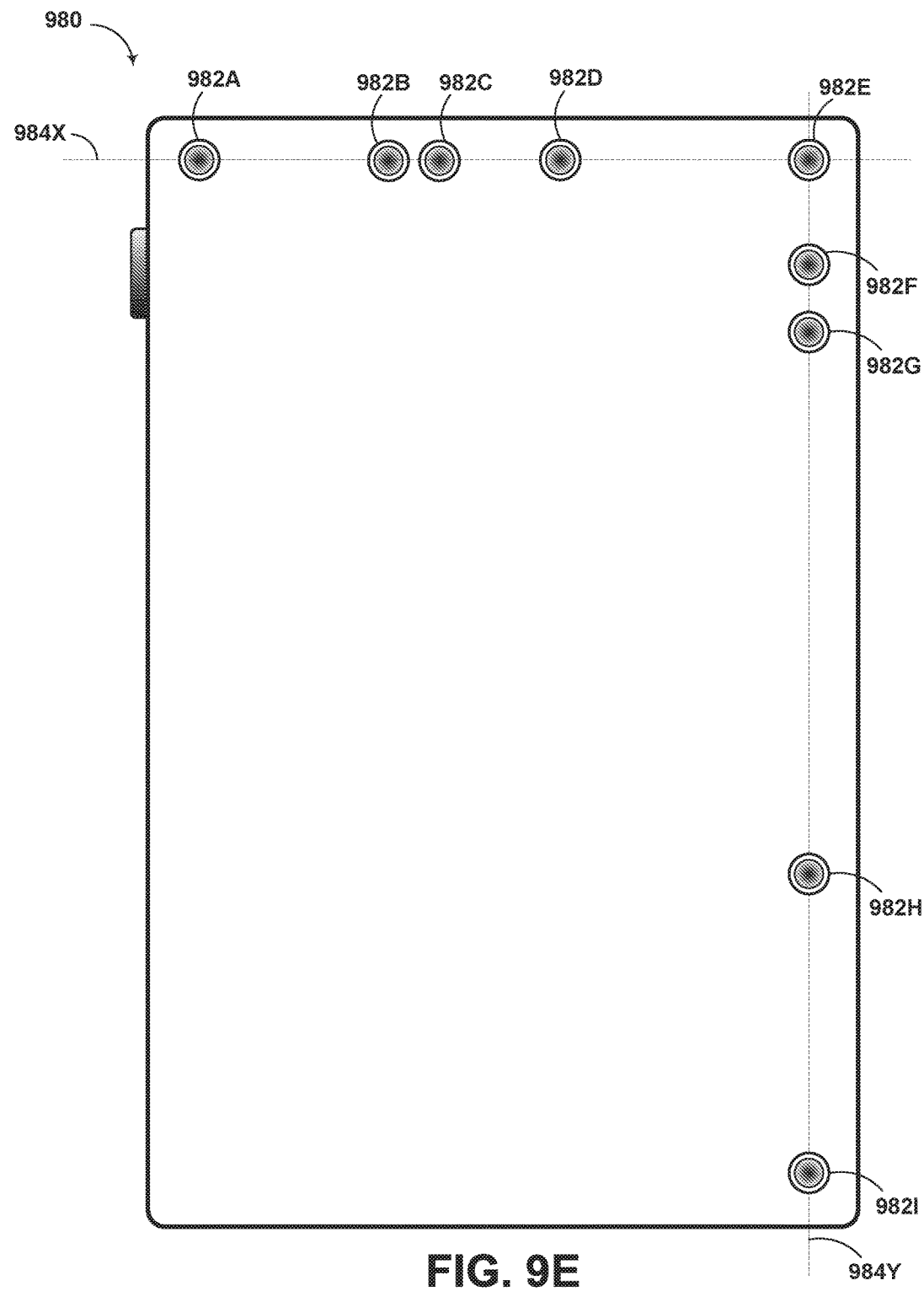
FIG. 9E shows another digital camera device with a multi-camera arrangement, in accordance with an example embodiment.

In another variation, FIG. 9E shows an arrangement with nine cameras 982A to 982I facing in the same direction. In FIG. 9E, the nine cameras 982A to 982F are placed on the back of the mobile device 980 along two axes 984X and 984Y. Accordingly, different pairs of cameras may be selected from cameras 982A to 982F to provide a number of different baselines along the two axes 984X and 984Y, as well as a number of different baselines that are not on along the two axes 984X, 984Y.

It is contemplated that other multi-camera arrangements may include more or fewer cameras than those shown in FIGS. 9A to 9E. In addition, the lenses in a multi-camera arrangement may be oriented at a different angle with respect to the surface on which the lenses are arranged. Yet further, it should be understood that multi-camera arrangements may be implemented on other sides of a mobile or other device. Other variations on the multi-camera arrangements shown in the figures are also possible.

Multi-element display 906 could represent a cathode ray tube (CRT) display, a light emitting diode (LED) display, a liquid crystal (LCD) display, a plasma display, or any other type of display known in the art. In some embodiments, multi-element display 906 may display a digital representation of the current image being captured by front-facing camera 904 and/or one, some, or all of rear-facing cameras 912A to 912C, or an image that could be captured or was recently captured by any one of or any combination of these cameras. Thus, multi-element display 906 may serve as a viewfinder for one or more cameras. Multi-element display 906 may also support touchscreen and/or presence-sensitive functions that may be able to adjust the settings and/or configuration of any aspect of mobile device 900.

Front-facing camera 904 may include an image sensor and associated optical elements such as lenses. Front-facing camera 904 may offer zoom capabilities or could have a fixed focal length. In other embodiments, interchangeable lenses could be used with front-facing camera 904. Front-facing camera 904 may have a variable mechanical aperture and a mechanical and/or electronic shutter. Front-facing camera 904 also could be configured to capture still images, video images, or both. Further, front-facing camera 904 could represent a monoscopic, stereoscopic, or multiscopic camera. Rear-facing cameras 912A to 912C may be similarly or differently arranged and/or configured. Additionally, front-facing camera 904, each rear-facing camera 912A to 912C, or any combination of these cameras, may in fact be an array of one or more cameras (or an array of lenses that direct light onto a common image sensor).

Any one or any combination of front facing camera 904 and rear-facing cameras 912A to 912C may include or be associated with an illumination component that provides a light field to illuminate a target object or scene. For instance, an illumination component could provide flash or constant illumination of the target object or scene. An illumination component could also be configured to provide a light field that includes one or more of structured light, polarized light, and light with specific spectral content. Other types of light fields known and used to recover three-dimensional (3D) models from an object or environment are possible within the context of the embodiments herein.

Any one or any combination of front facing camera 904 and rear-facing cameras 912A to 912C may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure setting of an associated camera, or to help in this determination.

Mobile device 900 could be configured to use multi-element display 906 and either front-facing camera 904 or one, some, or all of rear-facing cameras 912A to 912C to capture images of a target object or scene. The captured images could be a plurality of still images or a video stream. The image capture could be triggered by activating shutter button 908, pressing a softkey on multi-element display 906, or by some other mechanism. Depending upon the implementation, the images could be captured automatically at a specific time interval, for example, upon pressing shutter button 908, upon appropriate lighting conditions of the target object, upon moving digital camera device 900 a predetermined distance, upon adjusting a focus of one or more cameras of the mobile device 900, or according to a predetermined capture schedule.

A controller of a device (e.g., 900, 920, 940, 960, 980, a robot, a mapping system, a drone, a human interface system, a biometric system, an autonomous vehicle) could utilize images generated by two or more cameras, or by other image capture devices, to generate a disparity map for one or both of the pair of images. This disparity map could be generated by the methods described herein or by some other methods. For example, vertex-disparity loss functions could be determined for a plurality of vertices in a vertex space, based on a plurality of disparity loss functions of pixel locations in one or both of a pair of images. The determined vertex-disparity loss functions could be applied to determine respective vertex disparity values for the plurality of vertices and the determined vertex disparity values of one or more vertices associated with a pixel location of an image could be used to determine a disparity value for the pixel location. The controller could then utilize such pixel location disparity information to perform some application. For example, the controller could construct a depth map for an image, related to the distance between cameras that captured the image (e.g., cameras of a mobile device) and objects in a scene imaged by the cameras, based on the determined disparity information and information about the configuration of the cameras (e.g., a baseline separation distance between the cameras, a focal length of the cameras).

The determination of disparity values from images captured by a pair of cameras (i.e., from stereo image pairs captured by, e.g., cameras of the mobile device 900) or generated by some other means (e.g., image processing, virtual reality, computer-generated images, augmented reality) and/or determination of other information based on such determined disparity values could be performed by one or more processors (e.g., by one or more digital signal processors (DSPs), graphics processing units (GPUs), central processing units (CPUs), floating point units (FPUs), application-specific integrated circuits (ASICs), some other type of processors, and/or some combination of one or more types of processors). For example, certain operations related to determination of disparity values (e.g., matrix multiplication, determination of pixel location disparity values based on determined vertex disparity values) could be performed by a first processor or type of processor (e.g., DSPs, GPUs) and other certain operations related to determination of disparity values (e.g., step size optimization during a gradient descent operation to minimize a cost function) could be performed by a second processor or type of processor (e.g., a general-purpose CPU). The processor(s) could be disposed in a device containing cameras used to generate the captured images (e.g., the cameras and processor(s) could be disposed in a mobile device, e.g., 900, 920, 940, 960, 980).

In some examples, a stereo image pair captured by a pair of cameras (e.g., by cameras of the mobile device 900, of a robot, of a drone, or of some other apparatus) or generated in some other way could be stored (e.g., in memory of a device, in memory of a remote server in communication with a device) and a processor (e.g., a processor of a mobile device) could access the stereo image pair in order to generate a disparity map for one or both of the images of the stereo image pair. This disparity map could be generated by the methods described herein or by some other methods. In another example a device including two or more cameras and a controller (e.g., a mobile device, a robot, a drone, an autonomous vehicle) could be in communication with a remote system (e.g., a server) and the controller could operate the cameras to generate a stereo image pair of a scene (e.g., of an environment of the device). The controller could then operate to transmit the stereo image pair to the remote system, and the remote system could responsively determine disparity information for the stereo image pair (e.g., using the methods described herein, or other methods). The disparity information determined by the remote system could then be used for a variety of applications. In some examples, the determined disparity information could be transmitted to the device to enable an operation of the device Disparity information determined from a stereo image pair could be used to allow for a variety of applications. Applications could include performing a disparity-selective image processing on one or both of the images of the stereo image pair (e.g., to blur aspects of an image outside of a specified depth within the image), to identify a human, to determine a user interface command, to tag objects in an augmented reality display, to map an environment, or to perform some other operation. In some examples, a system including two cameras as described herein could be configured to navigate an environment. For example, the system could include a bipedal robot, a wheeled robot, a drone, a self-driving car, an autonomous vehicle, or some other device configured to navigate (e.g., to wholly or partially control its movement within) an environment (e.g., an airspace, a body of water, a roadway, an internal environment, an external environment). The determined disparity information (determined, e.g., by a processor of the device and/or by some other processing system in communication with the device) could be used to determine commands to operate elements of the device (e.g., motors, servos, actuators, propellers, legs, flight control surfaces) to navigate the device through an environment (e.g., to avoid obstacles in the environment, to maintain a course relative to objects (e.g., traffic control structures or roadway indicators) in the environment). Additional applications of determined disparity information are anticipated.

B. Illustrative Device Components

Figure 10:
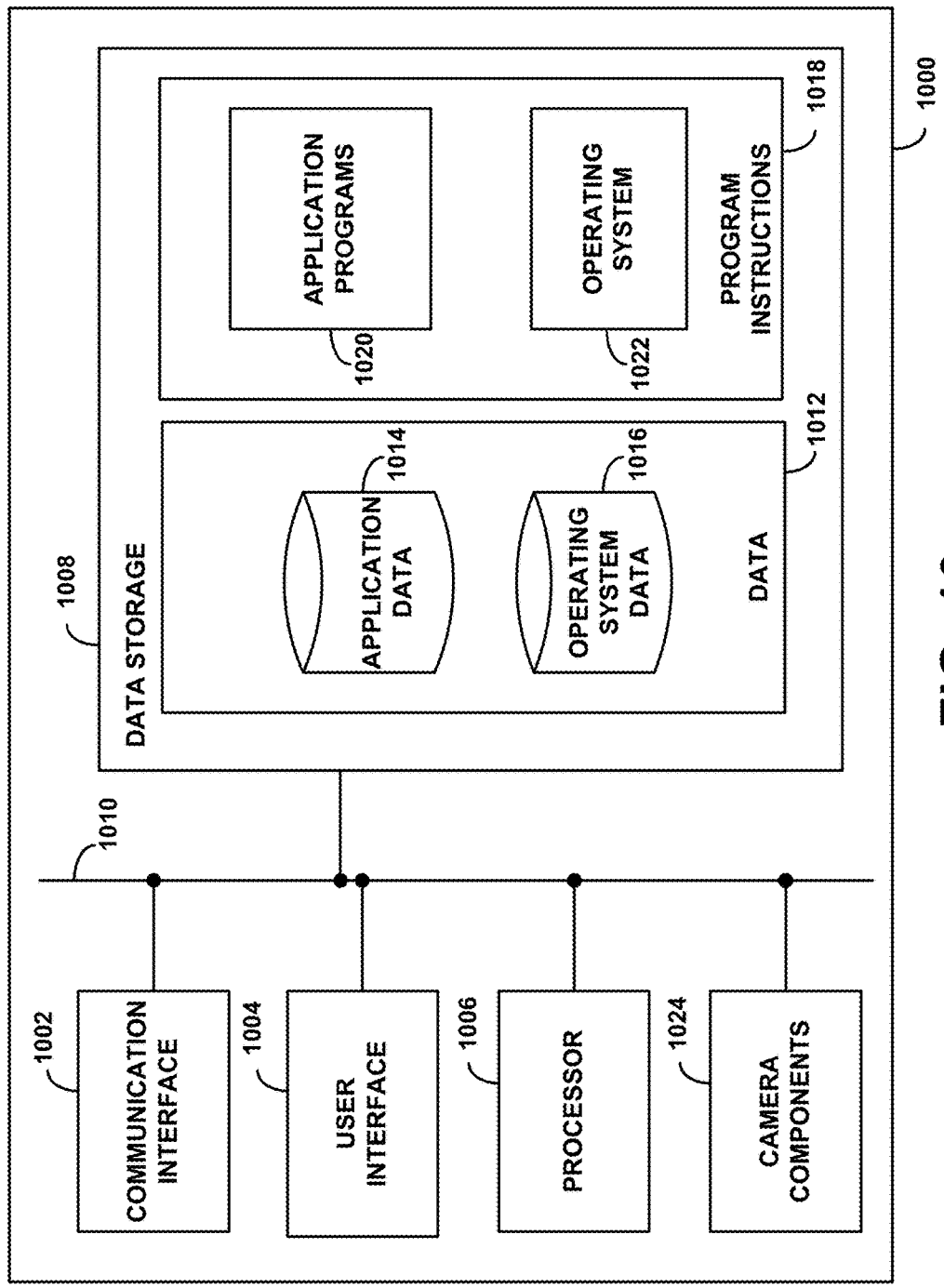
FIG. 10 is a simplified block diagram showing some of the components of an example computing device that may include camera components.

As noted above, computational functions (e.g., functions to determine disparity or other information based on a stereo image pair) of the mobile device 900—or of some other type of digital camera, robot, wearable computer, mapping system, drone, autonomous vehicle, or other apparatus—may be integrated into or take the form of a computing device, such as a mobile phone, tablet computer, laptop computer, server, cloud computing network, and/or programmable logic controller. For purposes of example, FIG. 10 is a simplified block diagram showing some of the components of an example computing device 1000 that may include camera components 1024. Camera components 1024 may include multiple cameras, such as cameras 912A to 912C.

By way of example and without limitation, computing device 1000 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, a robot, a drone, an autonomous vehicle, or some other type of device equipped with at least some image capture and/or image processing capabilities. It should be understood that computing device 1000 may represent a physical camera device such as a digital camera, a particular physical hardware platform on which a camera application operates in software, or other combinations of hardware and software that are configured to carry out image capture and/or processing functions.

As shown in FIG. 10, computing device 1000 may include a communication interface 1002, a user interface 1004, a processor 1006, data storage 1008, and camera components 1024, all of which may be communicatively linked together by a system bus, network, or other connection mechanism 1010.

Communication interface 1002 may function to allow computing device 1000 to communicate, using analog or digital modulation of electric, magnetic, electromagnetic, optical, or other signals, with other devices, access networks, and/or transport networks. Thus, communication interface 1002 may facilitate circuit-switched and/or packet-switched communication, such as plain old telephone service (POTS) communication and/or Internet protocol (IP) or other packetized communication. For instance, communication interface 1002 may include a chipset and antenna arranged for wireless communication with a radio access network or an access point. Also, communication interface 1002 may take the form of or include a wireline interface, such as an Ethernet, Universal Serial Bus (USB), or High-Definition Multimedia Interface (HDMI) port. Communication interface 1002 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 1002. Furthermore, communication interface 1002 may comprise multiple physical communication interfaces (e.g., a Wifi interface, a BLUETOOTH® interface, and a wide-area wireless interface).

In some embodiments, communication interface 1002 may function to allow computing device 1000 to communicate, with other devices, remote servers, access networks, and/or transport networks. For example, the communication interface 1002 may function to access first and second images (e.g., stereo image pairs) via communication with a remote server or other remote device or system in order to allow the computing device 1000 to generate a disparity map based on the accessed first and second images. For example, the remote system could be a server contained a memory containing one or more stereo image pairs. Additionally or alternatively, the remote system could include two or more cameras, or other image capture devices, configured to generate stereo image pairs that could be accessed as described above by computing device 1000. Such disparity information could be generated by the computing device 1000 according to the methods described herein or by some other methods.

User interface 1004 may function to allow computing device 1000 to interact with a user, for example to receive input from and/or to provide output to the user. Thus, user interface 1004 may include input components such as a keypad, keyboard, touch-sensitive or presence-sensitive panel, computer mouse, trackball, joystick, microphone, and so on. User interface 1004 may also include one or more output components such as a display screen which, for example, may be combined with a presence-sensitive panel. The display screen may be based on CRT, LCD, and/or LED technologies, or other technologies now known or later developed. User interface 1004 may also be configured to generate audible output(s), via a speaker, speaker jack, audio output port, audio output device, earphones, and/or other similar devices.

In some embodiments, user interface 1004 may include a display that serves as a viewfinder for still camera and/or video camera functions supported by computing device 1000 (e.g., for functions of images captured using the camera components 1024). Additionally, user interface 1004 may include one or more buttons, switches, knobs, and/or dials that facilitate the configuration and focusing of the camera components 1024 and the capturing of images using the camera components 1024. It may be possible that some or all of these buttons, switches, knobs, and/or dials are implemented as functions on a touch- or presence-sensitive panel.

Processor 1006 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other applications or functions. Data storage 1008 may include one or more volatile and/or non-volatile storage components, such as magnetic, optical, flash, or organic storage, and may be integrated in whole or in part with processor 1006. Data storage 1008 may include removable and/or non-removable components.

Processor 1006 may be capable of executing program instructions 1018 (e.g., compiled or non-compiled program logic and/or machine code) stored in data storage 1008 to carry out the various functions described herein. Therefore, data storage 1008 may include a non-transitory computer-readable medium, having stored thereon program instructions that, upon execution by computing device 1000, cause computing device 1000 to carry out any of the methods, processes, or functions disclosed in this specification and/or the accompanying drawings. The execution of program instructions 1018 by processor 1006 may result in processor 1006 using data 1012.

By way of example, program instructions 1018 may include an operating system 1022 (e.g., an operating system kernel, device driver(s), and/or other modules) and one or more application programs 1020 (e.g., camera functions, address book, email, web browsing, social networking, and/or gaming applications) installed on computing device 1000. Similarly, data 1012 may include operating system data 1016 and application data 1014. Operating system data 1016 may be accessible primarily to operating system 1022, and application data 1014 may be accessible primarily to one or more of application programs 1020. Application data 1014 may be arranged in a file system that is visible to or hidden from a user of computing device 1000.

Application programs 1020 may communicate with operating system 1022 through one or more application programming interfaces (APIs). These APIs may facilitate, for instance, application programs 1020 reading and/or writing application data 1014, transmitting or receiving information via communication interface 1002, receiving and/or displaying information on user interface 1004, capturing images using camera components 1024, and so on.

The determination of disparity values from images captured by a pair of cameras (i.e., from stereo image pairs captured by, e.g., camera components 1024) or generated by some other means (e.g., image processing, virtual reality, computer-generated images, augmented reality) and/or determination of other information based on such determined disparity values could be performed by one or more components of the processor 1006 (e.g., by one or more digital signal processors (DSPs), graphics processing units (GPUs), central processing units (CPUs), floating point units (FPUs), application-specific integrated circuits (ASICs), some other type of computational component, and/or some combination of one or more types of computational components, of the processor 1006). For example, certain operations related to determination of disparity values (e.g., matrix multiplication, determination of pixel location disparity values based on determined vertex disparity values) could be performed by a first computational element or type of computational element (e.g., DSPs, GPUs) of the processor 1006 and other certain operations related to determination of disparity values (e.g., step size optimization during a gradient descent operation to minimize a cost function) could be performed by a second computational element or type of computational element (e.g., a general-purpose CPU) of the processor 1006.

Application programs 1020 may take the form of "apps" that could be downloadable to computing device 1000 through one or more online application stores or application markets (via, e.g., the communication interface 1002). However, application programs can also be installed on computing device 1000 in other ways, such as via a web browser or through a physical interface (e.g., a USB port) of the computing device 1000.

Camera components 1024 may include, but are not limited to, an aperture, shutter, recording surface (e.g., photographic film and/or an image sensor), lens, and/or shutter. Camera components 1024 may be controlled at least in part by software executed by processor 1006 (e.g., by application programs 1020). Further, camera components 1024 may include multiple camera systems, which each camera system includes a respective aperture, shutter, recording surface, lens, image sensor, processor, and/or other elements.

When multiple camera systems are included, there may be some components that are shared between the systems, and other components that are not shared. For example, each camera could include its own aperture, lens, and image sensor, while sharing other components such as a processor, a data bus, and/or a shutter button. As another example, each camera could include its own lens, but share the same image sensor. Alternatively, an individual camera system's components may be utilized only for that individual camera system, and not shared with other camera systems.

C. Digital Images

A still camera may capture one or more images each time an image capture is triggered (e.g., that an electronic and/or mechanical shutter is operated). A video camera may continuously capture images at a particular rate (e.g., 24 images—or frames—per second) as long as image capture remains triggered (e.g., while a shutter button is held down, until a stop button is pressed). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured. Note that example embodiments may utilize cameras with electronic shutters and/or mechanical shutters.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different number of bits for pixel value representation (e.g., 10, 12, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on. In some examples, a color camera (e.g., a camera including a color image sensor) could be operated to generate black-and-white images by, e.g., determining a brightness of individual pixels based on color information of the individual pixels. For example, the color camera could be configured to generate a red, green, and blue detected light value for an individual pixel, and a brightness value for the individual pixel could be determined by summing the generated red, green, and blue detected light values for the individual pixel.

VII. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A method comprising:
receiving, by a computing system, a first image of a scene and a second image of the scene;
determining a disparity loss function for each of a plurality of pixel locations in the first image, wherein the disparity loss function for a given pixel location in the first image indicates variation in color-space similarity between: (a) the pixel location in the first image and (b) a corresponding range of pixel locations in the second image;
associating each of the plurality of pixel locations with one or more of a plurality of vertices in a vertex space, wherein the vertex space comprises two spatial dimensions and at least one color-space dimension;
for each vertex in the vertex space, determining a vertex-disparity loss function based on the disparity loss functions corresponding to the associated pixel locations from the first image;
applying the determined vertex-disparity loss functions to determine a respective disparity value for each of the plurality of vertices; and
for each of the pixel locations in the first image, using the determined disparity value of each of one or more vertices that are associated with the pixel location as a basis to determine a disparity value for the pixel location in the first image.

2. The method of claim 1, wherein applying the determined vertex-disparity loss functions to determine a respective disparity value for each of the plurality of vertices comprises minimizing a cost function, wherein the cost function receives the set of determined vertex disparity values as an input, wherein the cost function comprises a sum of:
- a loss term, wherein the loss term comprises a sum of the determined vertex-disparity loss functions, and
- a smoothness term, wherein the smoothness term is related to a similarity between individual vertex disparity values of the determined vertex disparity values.

3. The method of claim 1, wherein associating each of the plurality of pixel locations with one or more of a plurality of vertices in a vertex space comprises determining which of the vertices in the vertex space is more proximate in the vertex space to a particular pixel location than any other vertex of the plurality of vertices.

4. The method of claim 1, wherein the plurality of vertices are located in the vertex space at the vertices of a tessellated array of multidimensional simplexes in the vertex space.

5. The method of claim 1, wherein the plurality of vertices are located in the vertex space at the vertices of a tessellated array of multidimensional hyper-rectangles in the vertex space.

6. The method of claim 1, further comprising:
determining, by the computer system, a pixel depth value for each pixel location in the first image based on a respective determined disparity value of the pixel location in the first image.

7. The method of claim 1, wherein the disparity loss functions for each pixel location in the first image comprise hinge functions.

8. The method of claim 1, further comprising:
performing, by the computer system, image processing on the first image based on the determined disparity values for the pixel locations in the first image.

9. A non-transitory computer readable medium having stored therein instructions executable by a computing system to cause the computing system to perform functions comprising:
receiving, by the computing system, a first image of a scene and a second image of the scene;
determining a disparity loss function for each of a plurality of pixel locations in the first image, wherein the disparity loss function for a given pixel location in the first image indicates variation in color-space similarity between: (a) the pixel location in the first image and (b) a corresponding range of pixel locations in the second image;
associating each of the plurality of pixel locations with one or more of a plurality of vertices in a vertex space, wherein the vertex space comprises two spatial dimensions and at least one color-space dimension;
for each vertex in the vertex space, determining a vertex-disparity loss function based on the disparity loss functions corresponding to the associated pixel locations from the first image;
applying the determined vertex-disparity loss functions to determine a respective disparity value for each of the plurality of vertices; and
for each of the pixel locations in the first image, using the determined disparity value of each of one or more vertices that are associated with the pixel location as a basis to determine a disparity value for the pixel location in the first image.

10. The non-transitory computer readable medium of claim 9, wherein applying the determined vertex-disparity loss functions to determine a respective disparity value for each of the plurality of vertices comprises minimizing a cost function, wherein the cost function receives the set of determined vertex disparity values as an input, wherein the cost function comprises a sum of:
- a loss term, wherein the loss term comprises a sum of the determined vertex-disparity loss functions, and
- a smoothness term, wherein the smoothness term is related to a similarity between individual vertex disparity values of the determined vertex disparity values.

11. The non-transitory computer readable medium of claim 9, wherein associating each of the plurality of pixel locations with one or more of a plurality of vertices in a vertex space comprises determining which of the vertices in the vertex space is more proximate in the vertex space to a particular pixel location than any other vertex of the plurality of vertices.

12. The non-transitory computer readable medium of claim 9, wherein the plurality of vertices are located in the vertex space at the vertices of a tessellated array of multidimensional simplexes in the vertex space.

13. The non-transitory computer readable medium of claim 9, wherein the plurality of vertices are located in the vertex space at the vertices of a tessellated array of multidimensional hyper-rectangles in the vertex space.

14. The non-transitory computer readable medium of claim 9, wherein the functions further comprise:
determining, by the computer system, a pixel depth value for each pixel location in the first image based on a respective determined disparity value of the pixel location in the first image.

15. The non-transitory computer readable medium of claim 9, wherein the disparity loss functions for each pixel location in the first image comprise hinge functions.

16. The non-transitory computer readable medium of claim 9, wherein the functions further comprise:
performing, by the computer system, image processing on the first image based on the determined disparity values for the pixel locations in the first image.

17. A system comprising:
two or more image capture systems that are oriented in substantially the same direction; and
a control system configured to:
operate a first image capture system of the two or more image capture systems to capture a first image of a scene;
operate a second image capture system of the two or more image capture systems to capture a second image of a scene;
determine a disparity loss function for each of a plurality of pixel locations in the first image, wherein the disparity loss function for a given pixel location in the first image indicates variation in color-space similarity between: (a) the pixel location in the first image and (b) a corresponding range of pixel locations in the second image;
associate each of the plurality of pixel locations with one or more of a plurality of vertices in a vertex space, wherein the vertex space comprises two spatial dimensions and at least one color-space dimension;
for each vertex in the vertex space, determine a vertex-disparity loss function based on the disparity loss functions corresponding to the associated pixel locations from the first image;
apply the determined vertex-disparity loss functions to determine a respective disparity value for each of the plurality of vertices; and
for each of the pixel locations in the first image, use the determined disparity value of each of one or more vertices that are associated with the pixel location as a basis to determine a disparity value for the pixel location in the first image.

18. The system of claim 17, wherein the system comprises a mobile device.

19. The system of claim 17, wherein the system comprises a device configured to navigate an environment; wherein the two or more image capture systems are disposed on the device configured to navigate the environment.

20. The system of claim 17, wherein applying the determined vertex-disparity loss functions to determine a respective disparity value for each of the plurality of vertices comprises minimizing a cost function, wherein the cost function receives the set of determined vertex disparity values as an input, wherein the cost function comprises a sum of:
 a loss term, wherein the loss term comprises a sum of the determined vertex-disparity loss functions, and
 a smoothness term, wherein the smoothness term is related to a similarity between individual vertex disparity values of the determined vertex disparity values.

21. The system of claim 17, wherein associating each of the plurality of pixel locations with one or more of a plurality of vertices in a vertex space comprises determining which of the vertices in the vertex space is more proximate in the vertex space to a particular pixel location than any other vertex of the plurality of vertices.

22. The system of claim 17, wherein the plurality of vertices are located in the vertex space at the vertices of a tessellated array of multidimensional simplexes in the vertex space.

23. The system of claim 17, wherein the plurality of vertices are located in the vertex space at the vertices of a tessellated array of multidimensional hyper-rectangles in the vertex space.

24. The system of claim 17, wherein the controller is further configured to:
 determine a pixel depth value for each pixel location in the first image based on a respective determined disparity value of the pixel location in the first image.

25. The system of claim 17, wherein the disparity loss functions for each pixel location in the first image comprise hinge functions.

26. The system of claim 17, wherein the controller is further configured to:
 perform image processing on the first image based on the determined disparity values for the pixel locations in the first image.

* * * * *